(12) United States Patent
Bork et al.

(10) Patent No.: US 12,544,147 B2
(45) Date of Patent: Feb. 10, 2026

(54) APPARATUS, SYSTEMS, AND METHODS FOR INTRAOPERATIVE INSTRUMENT TRACKING AND INFORMATION VISUALIZATION

(71) Applicant: Verb Surgical Inc., Santa Clara, CA (US)

(72) Inventors: Felix Jonas Bork, Schnuerpflingen (DE); Risto Kojcev, Cupertino, CA (US); Bernhard Adolf Fuerst, Mountain View, CA (US); Berk Gonenc, Cupertino, CA (US)

(73) Assignee: Verb Surgical Inc., Santa Clara, CA (US)

( * ) Notice: Subject to any disclaimer, the term of this patent is extended or adjusted under 35 U.S.C. 154(b) by 551 days.

(21) Appl. No.: 17/684,407

(22) Filed: Mar. 1, 2022

(65) Prior Publication Data
US 2023/0277249 A1    Sep. 7, 2023

(51) Int. Cl.
*A61B 34/20* (2016.01)
*A61B 34/10* (2016.01)
(Continued)

(52) U.S. Cl.
CPC .............. *A61B 34/20* (2016.02); *A61B 34/10* (2016.02); *A61B 90/361* (2016.02); *A61B 90/50* (2016.02);
(Continued)

(58) Field of Classification Search
CPC ......... A61B 34/20; A61B 34/10; A61B 34/30; A61B 18/12; A61B 34/00; A61B 90/50
See application file for complete search history.

(56) References Cited

U.S. PATENT DOCUMENTS

| 2013/0041368 | A1* | 2/2013 | Cunningham | ......... A61B 34/30 606/34 |
|---|---|---|---|---|
| 2020/0179027 | A9* | 6/2020 | Walke | .................... A61B 18/00 |

(Continued)

FOREIGN PATENT DOCUMENTS

| KR | 10-20190015580 A | 2/2019 |
|---|---|---|
| KR | 10-20210068118 A | 6/2021 |
| WO | 2021171394 A1 | 9/2021 |

OTHER PUBLICATIONS

"EndoSLAM Dataset and An Unsupervised Monocular Visual Odometry and Depth Estimation Approach for Endoscopic Videos: Endo-SfMLearner," K. B. Ozyoruk et al., Medical Image Analysis 71 (2021), p. 1-30.

(Continued)

*Primary Examiner* — Anh Tuan T Nguyen
*Assistant Examiner* — Younhee Choi
(74) *Attorney, Agent, or Firm* — Aikin & Gallant, LLP

(57) ABSTRACT

Systems and methods for intraoperative tracking and visualization are disclosed. A current minimally invasive surgical (MIS) instrument pose may be determined based on a live intraoperative input video stream comprising a current image frame captured by a MIS camera. In addition, an instrument activation state and at least one parameter value associated with the instrument may also be determined. Intraoperative graphic visualization enhancements may be determined based on the activation state of the instrument, and/or a comparison of parameter values with corresponding parametric thresholds. The visualization enhancements may be applied to a current graphics frame. The current graphics frame may also include visualization enhancements related to proximate anatomical structures with proximity determined from the instrument pose and an anatomical model. The current graphics frame may be blended with the current (Continued)

input image frame to obtain an output blended image frame, which may form part of an output video stream.

17 Claims, 14 Drawing Sheets

(51) Int. Cl.
    *A61B 90/00*      (2016.01)
    *A61B 90/50*      (2016.01)
    *A61B 90/92*      (2016.01)
    *G06V 10/82*      (2022.01)

(52) U.S. Cl.
    CPC .............. *A61B 90/92* (2016.02); *G06V 10/82* (2022.01); *A61B 2034/102* (2016.02); *A61B 2034/105* (2016.02); *A61B 2034/2065* (2016.02); *A61B 2090/365* (2016.02); *A61B 2090/502* (2016.02)

(56) References Cited

U.S. PATENT DOCUMENTS

| | | | | |
|---|---|---|---|---|
| 2020/0188032 | A1* | 6/2020 | Komp | A61B 1/00042 |
| 2021/0298852 | A1* | 9/2021 | Crosetti | A61B 34/76 |
| 2021/0307841 | A1 | 10/2021 | Buch et al. | |
| 2021/0307870 | A1* | 10/2021 | Shelton, IV | G01B 11/25 |
| 2022/0104884 | A1* | 4/2022 | Leiderman | G06T 7/11 |
| 2022/0395334 | A1* | 12/2022 | Meglan | A61B 34/10 |
| 2022/0401148 | A1* | 12/2022 | Siemionow | G06T 17/00 |
| 2023/0051869 | A1* | 2/2023 | Geric | A61B 90/361 |
| 2023/0097849 | A1 | 3/2023 | Takahashi et al. | |
| 2023/0282345 | A1* | 9/2023 | Suzuki | G16H 40/63 705/2 |
| 2024/0032987 | A1* | 2/2024 | Lyons | A61B 17/32 |

OTHER PUBLICATIONS

Dense Depth Estimation from Stereo Endoscopy Videos Using Unsupervised Optical Flow Methods, Z. Yang et al. 25th Annual Conference on Medical Image Understanding and Analysis, p. 337-349, Springer, 2021.

"Live tracking and dense reconstruction for handheld monocular endoscopy," N. Mahmoud et al., IEEE transactions on Medical Imaging, 38 (1), Jan. 2019, p. 79-89.

"SLAM-based dense surface reconstruction in monocular minimally invasive surgery and its application to augmented reality." L. Chen, et al.,Computer Methods and Programs in Biomedicine, 158 (2018): p. 1-21 (135-146).

"ORBSLAM-based endoscope tracking and 3D reconstruction." N. Mahmoud et al., International workshop on Computer-Assisted and Robotic Endoscopy, Springer, 2016. (13 pages).

"Optical Techniques for 3D Surface Reconstruction in Computer-Assisted Laparoscopic Surgery," L. Maier-Hein et al., Medical Image Analysis 17.8 (2013): 974-996.

"Augmented reality navigation for liver resection with a stereoscopic laparoscope." Computer Methods and Programs in Biomedicine, H. Luo et al. 187 (2020): 105099 (13 pages).

"Preoperative liver registration for augmented monocular laparoscopy using backward-forward biomechanical simulation," E. Özgür et al., International Journal of Computer Assisted Radiology and Surgery , 13.10 (2018): 1629-1640.

"Context-aware augmented reality for laparoscopy," V. Penza, et al., Sixth National Congress of Bioengineering, Politecnico di Milano, Milan (Italy), Gruppo Nazionale di Bioingengneria. 2018.

"Registration, " L. Maier-Hein et al., Mixed and augmented reality in medicine. CRC Press, 2018. 29-45.

"Detection, segmentation, and 3D pose estimation of surgical tools using convolutional neural networks and algebraic geometry," K. Hasan et al.,Medical Image Analysis, 70 (2021): 101994. (44 pages).

"Comparative validation of multi-instance instrument segmentation in endoscopy: results of the ROBUST-MIS 2019 challenge." R. Tobias et al. Medical Image Analysis 70 (2021) 101920, p. 1-26.

"Deep residual learning for instrument segmentation in robotic surgery," D. Pakhomov et al., International Workshop on Machine Learning in Medical Imaging. Springer, 2019.

"Concurrent segmentation and localization for tracking of surgical instruments." I. Laina et al., International conference on medical image computing and computer-assisted intervention. Springer, Cham, 2017, p. 1-10.

"DefSLAM: Tracking and Mapping of Deforming Scenes from Monocular Sequences ," J. Lamarca et al., IEEE Trans. Robotics 37(1): 291-303 (2021).

"Elastix: A Toolbox for Intensity-Based Medical Image Registration," S. Klein et al., IEEE Transactions on Medical Imaging, vol. 29, No. 1, Jan. 2010 p. 196-205.

International Search Report and The Written Opinion of the International Searching Authority issued for PCT Patent Application No. PCT/IB2023/051857, mailed on Jun. 8, 2023, 10 pages.

International Preliminary Report of Patentability issued for PCT Patent Application No. PCT/IB2023/051857, mailed on Aug. 30, 2024, 7 pages.

\* cited by examiner

APPARATUS, SYSTEMS, AND METHODS FOR INTRAOPERATIVE INSTRUMENT TRACKING AND INFORMATION VISUALIZATION

FIELD

The subject matter disclosed herein relates to intraoperative instrument tracking and visualization and specifically to apparatus, systems, and methods that augment intraoperative image display, facilitate data visualization, and enhance safety.

BACKGROUND

Visualization systems are often used intraoperatively for imaging tissue, performing biopsies, surgery, diagnostic, and/or other medical procedures. The term "intraoperative" as used herein refers to actions performed or events that occur during any medical procedure (invasive or non-invasive). In many instances, such as during endoscopic procedures, pertinent medical information relevant to diagnosis and/or decision making may not be easily available to the attending physician. For example, patient medical information (e.g. medical history, vital parameters, etc.), device state and device parameters (e.g. for instruments and/or robots being used to facilitate the medical procedures being performed), real time information (e.g. related to tissues during the procedure), etc. are typically part of entirely different subsystems for various operational and other reasons (e.g. privacy, data security, limited interoperability, etc.). Thus, intraoperative access to the above medical information may involve multiple display screens and/or rely on other personnel to provide the information, which can detract from focus on the medical procedure, increase the cognitive load/mental effort on the part of the physician, and interrupt procedural flow thereby increasing the risk of error(s), lengthening procedure time, and increasing cost. Moreover, when head mounted displays (HMDs) and/or stereoscopic headsets are used (e.g. during endoscopic and/or robotically assisted procedures) removing, putting on, and/or otherwise adjusting the HMDs and/or headsets to look at other display screens may be cumbersome. Accordingly, some embodiments disclosed herein ease performance of medical procedures, including endoscopic and/or robotically assisted procedures, in part by facilitating instrument tracking intraoperatively and augmenting information visualization.

SUMMARY

In some embodiments, a processor-implemented method may comprise: determining a current instrument pose associated with a surgical device instrument based on a live intraoperative input video stream captured by a MIS camera, wherein the input video stream comprises a current input image frame that includes an image of the instrument; determining an activation state of the instrument, and at least one parameter value associated with the instrument; determining one or more first intraoperative graphic visualization enhancements based on (a) an activation state of the instrument, and (b) a comparison of the at least one parameter value with at least one corresponding parametric threshold, wherein the first intraoperative graphic visualization enhancements are applied to a current graphics frame; and initiating display of a blended image frame comprised in a blended output video stream, wherein the blended image frame is obtained by blending the current input image frame with the current graphics frame.

In another aspect, a surgical device system may comprise: a camera to obtain a live intraoperative video stream, an instrument, a memory, and a processor coupled to the camera, the instrument, and the memory. In some embodiments, the processor may be configured to: determine a current instrument pose associated with the instrument based on the live intraoperative input video stream, wherein the input video stream comprises a current input image frame that includes an image of the instrument; determine an activation state of the instrument, and at least one parameter value associated with the instrument; determine one or more first intraoperative graphic visualization enhancements based on (a) an activation state of the instrument, and (b) a comparison of the at least one parameter value with at least one corresponding parametric threshold, wherein the first intraoperative graphic visualization enhancements are applied to a current graphics frame; and initiate display of a blended image frame comprised in a blended output video stream, wherein the blended image frame is obtained by blending the current input image frame with the current graphics frame.

In a further aspect, a system may comprise: means for determining a current instrument pose associated with a surgical device instrument based on a live intraoperative input video stream captured by an surgical device imaging means, wherein the input video stream comprises a current input image frame that includes an image of the instrument; means for determining an activation state of the instrument, and at least one parameter value associated with the instrument; means for determining one or more first intraoperative graphic visualization enhancements based on (a) an activation state of the instrument, and (b) a comparison of the at least one parameter value with at least one corresponding parametric threshold, wherein the first intraoperative graphic visualization enhancements are applied to a current graphics frame; and means for initiating display of a blended image frame comprised in a blended output video stream, wherein the blended image frame is obtained by blending the current input image frame with the current graphics frame In some embodiments, a computer-readable medium may comprise instructions to configure a processor to: determine a current instrument pose associated with a surgical device instrument based on a live intraoperative input video stream captured by a surgical device camera, wherein the input video stream comprises a current input image frame including an image of the instrument; intraoperatively identify one or more proximate anatomical structures that lie within a distance threshold of the instrument in the current input image frame based on the current instrument pose and a 3 dimensional (3D) anatomical model; determine one or more intraoperative graphic visualization enhancements in the current input image frame based on (a) an activation state of the instrument, and (b) a determination that one or more parameters associated with the instrument fall outside one or more corresponding parametric thresholds, and (c) the one or more proximate anatomical structures; and initiate display of a blended image frame comprised in a blended output video stream, wherein the blended image frame is obtained by blending the current input image frame with the graphic visualization enhancements.

BRIEF DESCRIPTION OF THE DRAWINGS

Embodiments of the invention will be described, by way of example only, with reference to the drawings.

Figure 1A:
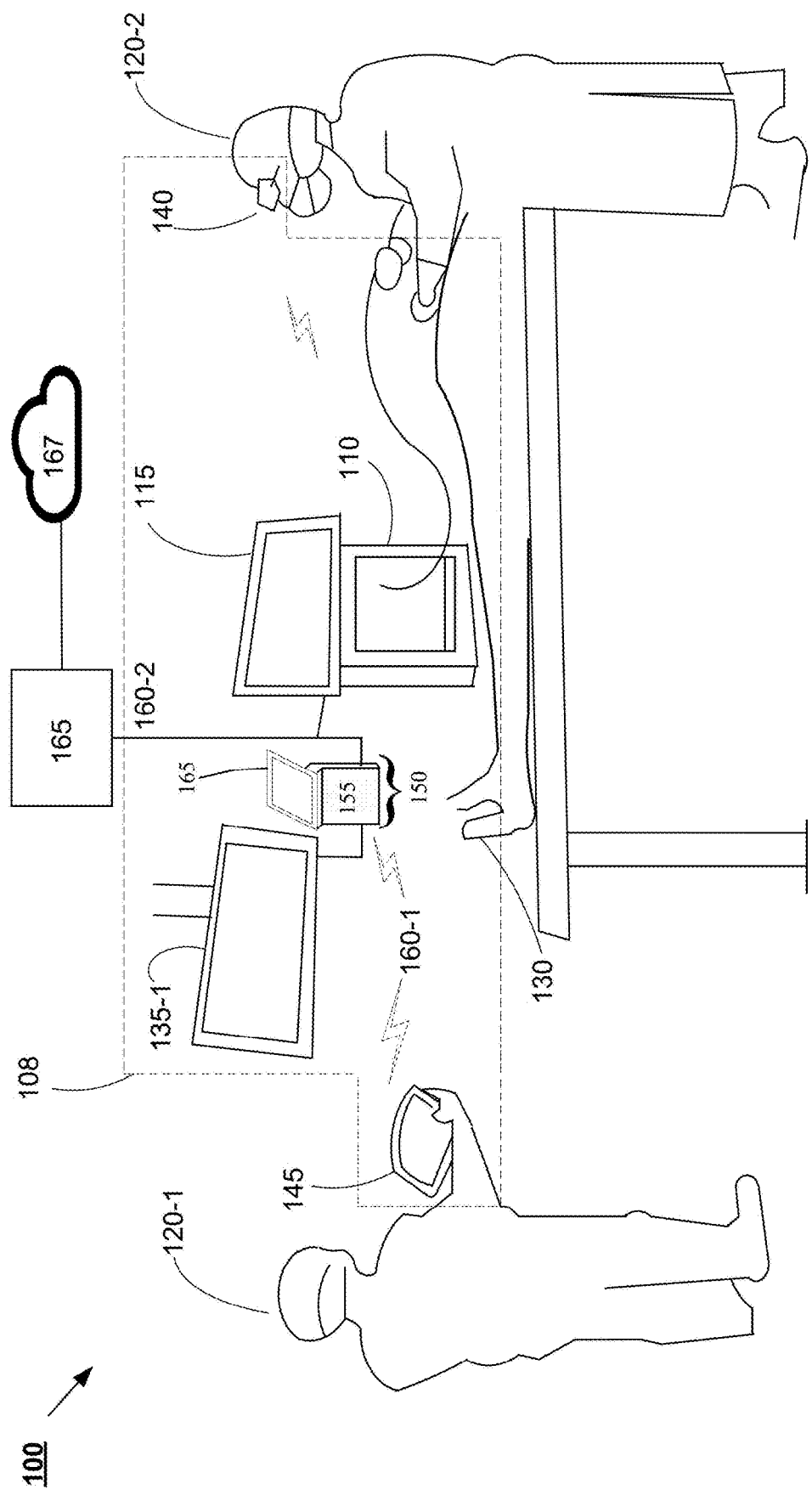
FIG. 1A shows an example diagram illustrating an example system for intraoperative visualization in accordance with certain embodiments disclosed herein.

Like reference numbers and symbols in the various figures indicate like elements, in accordance with certain example embodiments. In addition, multiple instances of a functional element may be indicated by following a first number for the element with a letter or with a hyphen and a second number. For example, multiple instances of an element 160 may be indicated as 160-1, 160-2, 160-3 etc. In some instances, the suffixes may refer to the same element but in a different state and/or at a different time. When referring to such an element using only the first number, any instance of the element is to be understood (e.g. element 160 in the previous example would refer to elements 160-1, 160-2, and/or 160-3).

DETAILED DESCRIPTION

Some disclosed embodiments pertain to apparatus, systems, and methods to facilitate instrument tracking intraoperatively, augment intraoperative image display, facilitate data visualization, and enhance safety of medical procedures. In some embodiments, disclosed techniques may be applied during minimally invasive surgical (MIS) procedures including procedures involving robots/robotic surgery.

While intraoperative visualization facilitates the imaging of tissue, during medical procedures such as performing biopsies, surgery, diagnostic procedures, etc., pertinent medical information relevant to intraoperative procedure may be absent and/or involve the use of multiple distinct display systems thereby interrupting the procedural flow and increasing the likelihood of errors.

Some disclosed embodiments pertain to systems, apparatus, and methods for real-time synchronization of a video stream from minimally-invasive surgical (MIS) devices with information pertaining to energy devices (e.g. which may form part of the MIS system and/or be coupled to the MIS system) and/or other medical sub-systems. Minimally invasive surgery refers to medical procedures performed using endoscopic and/or laparoscopic devices. In some instances, MIS devices may form part of a robotic surgical system. In some embodiments, alpha blending (or α-blending) techniques may be used to overlay and/or blend video streams from an endoscopic device with energy device information, end-effector information, and/or information from other medical sub-systems. The term energy device is used to refer to instruments that emit energy, which may be used to cut (dissect, transect, excise, ablate, etc.), perform biopsies, cauterization, electrocoagulation, etc. Energy may be used and transmitted by energy devices in various forms such as high frequency radiation, ultrasonic energy, microwave radiation, direct heat application, mechanical energy (e.g. to cut tissue), etc. The transmitted energy interacts with living tissue, which can be used (depending on the procedure being performed) to cut tissue and organs or to stop bleeding. One concern with the use of energy devices is that the energy transmissions may affect tissue or structures unrelated to the actual target of the procedure, which can lead to medical complications and lengthen recovery times. The term energy device is also used herein to refer to end-effectors. End-effectors refer to instruments (e.g., snares, graspers, cautery knives, etc.) that may be coupled to an endoscopic or robotic device arm and transfer or use energy to manipulate tissue. End-effectors may be of various types and can be specific to the medical procedure being performed.

Disclosed embodiments facilitate blending of energy device related information onto the input live video stream thereby facilitating seamless visualization of energy device information in real-time and intraoperatively (during the surgical procedure) thereby reducing interruptions, facilitating visualization of device energy related information and/or other parameters, and reducing the procedural cognitive load. In some embodiments, auditory interfaces and/or haptic interfaces may also be used provide additional feedback to the surgeon.

For example, some disclosed embodiments provide visual and/or auditory warnings during laparoscopic surgery in the event that the blade temperature of an energy instrument is above a temperature threshold and a distance to one or more anatomical structures is below a predetermined safety distance or safety threshold. The term threshold, as used herein, may refer to a ceiling (upper limit), floor (lower limit), or a range (e.g. between an upper limit and lower limit). A parameter value may be determined to fall outside a threshold if the parameter value is higher than the ceiling, lower than the floor, or outside the range.

In some embodiments, the anatomical structures may be identified automatically (e.g. based on the procedure) and may be visually augmented (e.g. using augmented reality (AR) techniques) when their proximity to the energy device is below some distance threshold. The term augmented reality or AR refers to a computer generated visual enhancement or augmentation of objects in a camera view. The augmentation or visual enhancements may be based on the camera pose (position and orientation of the camera or imaging device) so that they appear to be a natural part of the scene (and are not seen as extraneous artifacts). AR may also involve the enhancement or addition of other perceptual information such as auditory and haptic information. Further, in some embodiments, visual augmentations (e.g. using AR) may also be used to highlight the energy device when the device is above a temperature threshold. In some embodiments, the endoscopic video stream may be augmented with a heat map and/or proximity map to indicate the susceptibility of various tissue regions to energy transmissions based on their proximity. In some embodiments, an artificial intelligence (AI) and/or machine learning (ML) ("AI/ML") model may be trained using supervised leaning (e.g. in an offline phase) to identify specific anatomical structures (e.g. blood vessels, organs, etc.) in input video streams. The AI/ML model may be trained using preoperative images, 3D models (e.g. from computer tomography (CT) scans), etc. and live video streams. During the training phase, the model may be trained to identify anatomical structures (e.g. blood vessels) that are common across procedures and/or that are specific to a class of procedures (e.g. gastro-intestinal, respiratory, urinary, gynecological, etc.).

In some embodiments, during operation, anatomical structures of interest in the field of view (FOV) may be identified in real-time in the live intraoperative video stream, the state of the energy device may be determined, and distance of the anatomical structures of interest to the energy device may be determined. The state of the energy device and/or distance of the anatomical structures of interest may be used to alert the medical practitioner. In some embodiments, alerting may occur by one or more of: (a) augmenting visualization of the identified anatomical structures of interest; (b) augmenting visualization of the energy device to indicate energy device state; (c) augmenting the live intraoperative video stream with a proximity map and/or heat map based on the proximity of the anatomical structures of interest to the energy device; (d) providing an auditory and/or visual indication of device state when safety margins (e.g. based on energy and/or proximity and/or length of activation time) are breached; (e) providing other (e.g. textual or graphic) information related to one or more of (a) through (d) above and/or other procedural information, and/or information from one or more additional medical sub-systems composited with the live intraoperative video stream. For example, in relation to (e) above, patient medical information (e.g. medical history, vital parameters pre-operative and/or intra-operative, etc.), real time tissue state information, etc. (which may be typically part of entirely different subsystems for various reasons) may be composited and displayed along with the live intraoperative video stream. The information to be displayed may be determined based on user-profile (e.g. associated with a medical professional performing the procedure), system settings (e.g. set by the medical professional), procedure specific settings (e.g. based on the type of procedure being performed), and/or some combination of the above. In some embodiments, the live intraoperative video stream may be a high-definition (HD) stereoscopic (3D) video stream, which may be viewed by the practitioner with augmentations on a HMD. Accordingly, the embodiments disclosed herein ease performance of medical procedures, including endoscopic and/or robotically assisted procedures, and enhance procedural safety in part by facilitating instrument tracking intra-operatively and augmenting information visualization.

In some embodiments, inputs from multiple graphics and video streams may be received. The graphics streams may include instrument sensor data, robot information and parameters (e.g. during robot-assisted surgery), information provided by an Artificial Intelligence (AI) engine, which may be based on analysis of video streams, etc. The information provided by the AI engine may include intraoperative guidance, suggestions, augmentations (e.g. to the video stream), warnings, and/or assistance. In some embodiments, the AI information may be provided in the form of augmentations (e.g. using augmented reality (AR) techniques over a live intraoperative video stream). The live intraoperative video stream may include 3D video obtained by a medical device (such as an endoscope) during the intraoperative procedure, etc. In some embodiments, one or more of the intraoperative video streams may be blended (e.g. using alpha blending or α-blending) with one or more graphics streams and displayed to medical personnel (e.g. a surgeon) on one or more of a monitor, HMD, and/or a portable computing device to facilitate performance of the intraoperative procedure. For clarity, the live video obtained intraoperatively by a medical device (such as the endoscope) being used for performance of a medical procedure is also referred to herein as the live video stream or intraoperative live video stream. The terms "composite stream" or "blended stream" are used to refer to result of blending the first live video stream and one or more graphics streams.

FIG. 1A shows an example diagram illustrating an example system for intraoperative visualization in accordance with certain embodiments disclosed herein. FIG. 1A shows patient 130 undergoing a medical procedure involving the use of an endoscope (not shown in FIG. 1A) being operated by surgeon 120-2. In FIG. 1A, in some embodiments, hub 150 (including base unit 155 and tablet or mobile computer that houses touchscreen 165), HMD 140, displays 135-1 and 115, tablet 145, along with surgical devices (e.g., endoscope, laparoscope, robotic device etc.—not shown in FIG. 1A), endoscopic controller 110, and camera(s), and instrument(s) coupled to the surgical devices may form part of an MIS system 108 (shown enclosed by the dashed box in FIG. 1A). Endoscopic controller 110 may control the endoscope and/or surgical/robotic device based on input by medical professional 140.

As shown in FIG. 1A, apparatus 150 (hereinafter referred to as "hub 150") may receive data streams over network 165 (e.g. also referred to as hospital network 170), which may be coupled to devices that are local to the medical facility. Hub 150 may take the form of or include functionality of a computing device capable of graphics and video processing. Hub 150 may also receive multimedia streams such as a video stream from the endoscope (not shown in FIG. 1A) used by medical professional 120-2, pre-operative images (e.g. from storage or other devices coupled to network 170), and intra-operative images (e.g. from local imaging devices). Medical professional 120-2 may view the video from the endoscope using headmounted display (HMD) 140, which may display high-definition (HD) 3-dimensional (3D) or stereoscopic images. In some embodiments, hub 150 may be integrated with a MIS system 108 (e.g., part of or a subsystem of the MIS system), or in other embodiments, may be a separate system operationally coupled (e.g., docked to the MIS system 108 via a docking port/station, and/or coupled to the MIS system using a wired and/or wireless interface). Likewise, in some embodiments, HMD 140 may also be a part of and/or a subsystem of MIS, or operationally coupled (e.g. using a wired or wireless interface) to the MIS system. As outlined previously MIS system 108 may take the form of an endoscopic system, laparoscopic system, and/or a robotic medical device.

In some embodiments, video from the endoscope may be received by Hub 150, processed, and then transmitted wirelessly to HMD 140. In some embodiments, the endoscopic (first) input video stream seen by medical professional 120-2 may be blended with one or more second graphics streams such as graphics, AI input, sensor data, etc. based on the configuration of hub 150. Sensor data may include data from sensors associated with the endoscope or other instruments (including energy devices) being used by medical professional 120, which may provide and/or be used to determine camera and/or instrument pose, instrument state, and other information. HMD 140 may be custom or a commercially available HMD.

The term "pose" (e.g., "camera pose" or "instrument pose") refers to the position and orientation of the appropriate element (camera or instrument). In some embodiments, pose may be determined for 6-Degrees Of Freedom (6DOF), which refers to three translation components (which may be given by X,Y,Z coordinates) and three angular components (e.g. roll, pitch and yaw) relative to a frame of reference. In some embodiments, the pose (camera or instrument) may be determined and/or tracked by a processor using a visual tracking solution based on images captured by a camera, which for a 3D video stream, may include depth information. Instrument pose may be determined from a combination of inputs from sensors coupled to actuators associated with the instrument (where the actuator states may provide an indication of instrument location), and/or known shape and dimensional parameters associated with the instrument, and/or identification of the instrument in the current FoV of the camera (which may be used to determine instrument location based on the known or determined location of the camera and/or MIS device geometry).

In some embodiments, camera(s) may include image sensors such as CCD, CMOS, and/or optical sensors and may convert an optical image into an electronic or digital image and may send captured digital images to a processor. In some embodiments, cameras may be color cameras providing "color information," which may be viewed as comprising 1 to N channels, where N is some integer dependent on the color space being used to store the image. For example, an RGB image comprises three channels, with one channel each for Red, Blue and Green information. Color image may also be obtained in various other color spaces such as Hue Saturation Lightness (HSL), Hue Saturation Value (HSV), or Hue Saturation Brightness (HSB), etc.

In some embodiments, camera(s) may further include depth sensors, which may provide "depth information." The term "depth sensor" is used to refer to functional units that may be used to obtain per-pixel depth (D) information independently and/or in conjunction with the capture of color (e.g. RGB) images by camera(s). The depth sensor may capture depth information for a scene in the camera's field of view. Accordingly, each color image frame may be associated with a depth frame, which may provide depth information for objects in the color image frame. In one embodiment, camera(s) may be stereoscopic and capable of capturing 3D images. For example, a depth sensor may take the form of a passive stereo vision sensor, which may use two or more cameras to obtain depth information for a scene. The pixel coordinates of points common to both cameras in a captured scene may be used along with camera pose information and/or triangulation techniques to obtain per-pixel depth information passively. In another embodiment, camera(s) may comprise color cameras with active depth sensors, which may capture per-pixel depth information when the active depth sensor is enabled in addition to color images. As another example, in some embodiments, an active depth sensor may take the form of a Time Of Flight (ToF) sensor. The term ToF sensor is used to refer to sensors that determine depth information using light such as structured light, strobes, etc. For example, a strobe light coupled to the 3D camera may illuminate objects in a scene and reflected light may be captured by a CCD/CMOS or other image sensors. Depth information may be obtained by measuring the time that the light pulses take to travel to the objects and back to the sensor. As another example, a light source may project a structured or textured light pattern, which may consist of one or more narrow bands of light, or a checkerboard pattern, onto objects in a scene. Depth information may then be obtained by exploiting geometrical distortions of the projected pattern caused by the shape of the object's surface. In one embodiment, depth information may be obtained from a combination of an infra-red structured light projector and an infra-red camera registered to a RGB camera.

In some embodiments, model-based tracking techniques such as Visual Simultaneous Localization And Mapping (VSLAM) algorithms may use image and depth information in (or derived from) camera captured images to determine 6DOF camera pose estimates. In some embodiments, the MIS system may include other sensors such as inertial measurement units (IMUs) and/or accelerometers etc., which may also provide input for camera pose determination. SLAM/VSLAM based techniques may facilitate the generation of maps of an unknown environment while simultaneously localizing the position of the camera. In VSLAM, the images (and any depth information) obtained by the camera may be used to model an unknown scene with relatively low computational overhead, which may facilitate real-time and/or near real time modeling. VSLAM may thus involve tracking the 6DOF pose of a camera while also determining or refining the 3-D structure of the surrounding scene.

For example, in some embodiments, VSLAM techniques may detect salient feature patches in one or more captured image frames and store the captured imaged frames as keyframes or reference frames. In keyframe based SLAM, the pose of the camera may then be determined, for example, by comparing a currently captured image frame with one or more keyframes and determining camera pose based in part on the position and other characteristics of common features in the current frame relative to the keyframe.

In some embodiments, Scale Invariant Feature Transform (SIFT) techniques may be used to identify features such as corner points, edges etc. in an image frame. SIFT-based descriptors and variants thereof, which include a variety of computationally efficient modified SIFT descriptors, facilitate robust tracking and feature correspondence between images. In some embodiments, keypoints in an image frame may be identified and local descriptors corresponding to the individual keypoints may be built and used to track image features. A "patch" or "image patch" is a region of pixels around a feature point, which may be used for tracking. The techniques outlined above are merely examples, and, in some embodiments, various other techniques may be used for feature detection. For example, techniques based on Features from Accelerated Segment Test ("FAST") variants thereof, Speeded-Up Robust Features ("SURF") or variants thereof, Oriented FAST and Rotated BRIEF ("ORB") or variants thereof, hybrid point and/or edge detection techniques, gradient based techniques, etc. may be used for feature detection with appropriate modifications as would be apparent to one of skill in the art. When VSLAM used in conjunction with Augmented Reality (AR) techniques, virtual objects can be inserted into a user's view of the real world and displayed on a mobile device. The virtual objects may include highlights, emphasis, and/or other visual enhancements of real objects.

As a further example, a dense SLAM method may be used with a monocular endoscope, where clusters of video frames are segmented according to parallax criteria and sparse SLAM feature matches are used to accurately estimate cluster frame poses. Dense matches between cluster frames may be computed in parallel by a variational approach combining zero mean normalized cross correlation and a gradient Huber norm regularizer. The Huber norm is an hybrid error measure that is robust to outliers. The Huber norm can be minimized with a gradient-based algorithm and is used as a regularization term of optimization problems in computer-graphics problems. The dense SLAM approach above is robust in the face of challenging lighting, poor textures, and the deformations that are typically encountered in endoscopy. Moreover, the dense SLAM approach above may be run in real time on processors (e.g. GPUs) and facilitate parallel endoscope positional tracking and 3-D scene reconstruction without external markers or tracking devices and is easily integrated into a surgical workflow. The approach above is described in "Live tracking and dense reconstruction for handheld monocular endoscopy," N. Mahmoud, et al., IEEE transactions on medical imaging (2018), pp. 79-89, which is incorporated by reference herein in its entirety.

As another example, DefSLAM, which facilitates tracking and mapping in deforming scenes in real time may be used. DefSLAM combines Shape-from-Template (SfT) and Non-Rigid Structure-from-Motion (NRSfM) techniques during exploratory SLAM sequences. Deformation tracking is used to determine the pose of the camera and deformation of the observed map at the frame rate by means of SfT processing of a template that models the scene shape-at-rest. A deformation mapping thread runs in parallel with the tracking to update the template, at keyframe rate, by means of isometric NRSfM processing of a batch of full perspective keyframes. DefSLAM produces accurate 3D models of the scene with respect to a moving monocular camera. DefSLAM is described in "DefSLAM: Tracking and Mapping of Deforming Scenes from Monocular Sequences," J. Lamarca et al., IEEE Transactions on Robotics, (2020): 291-303, which is incorporated by reference herein in its entirety.

Figure 1B:
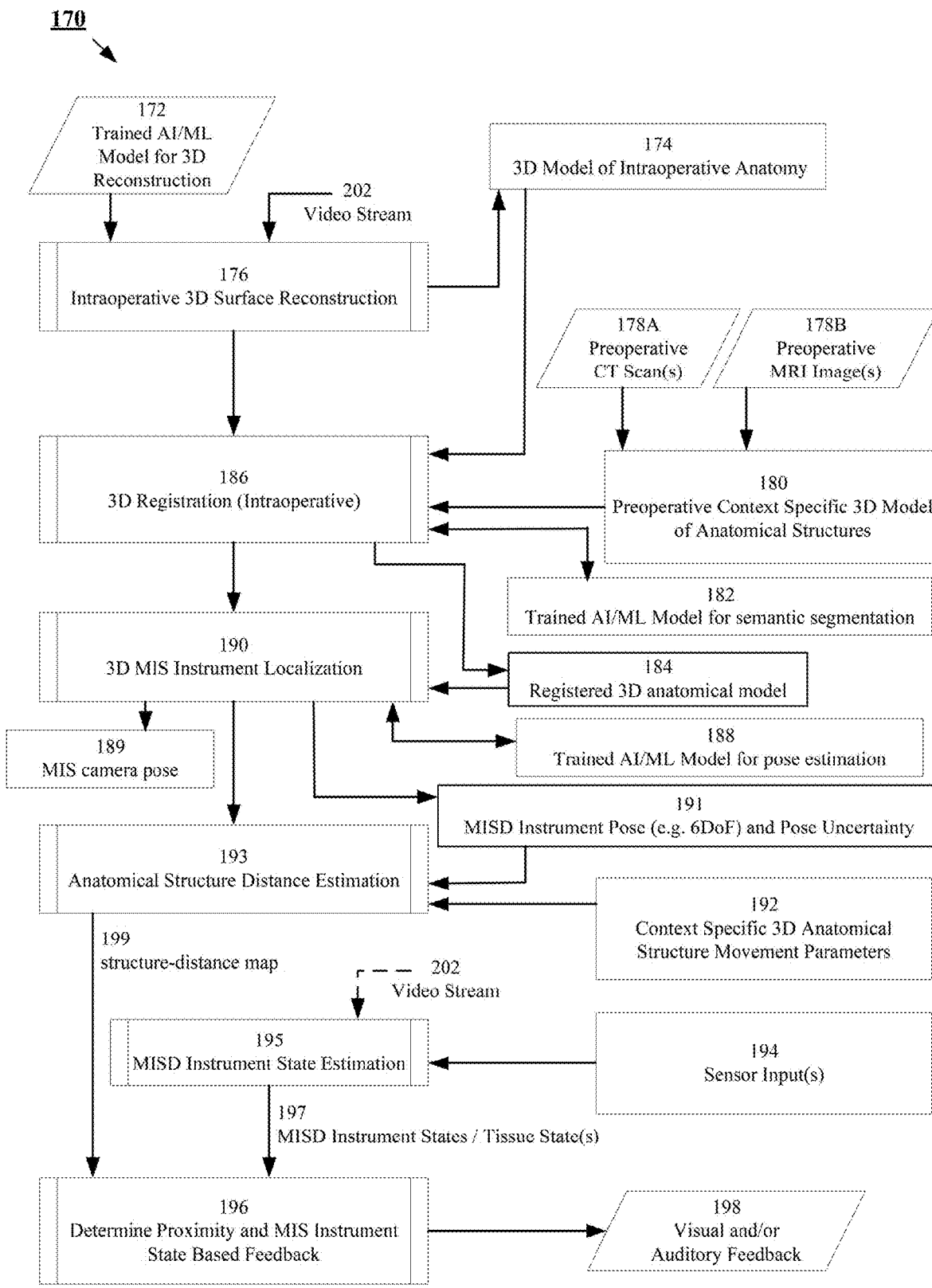
FIG. 1B shows a process flow illustrating an example method for intraoperative visualization in accordance with certain embodiments disclosed herein.

FIG. 1B shows a process flow illustrating an example method 170 for intraoperative tracking and visualization in accordance with certain embodiments disclosed herein. Referring to FIG. 1B, in some embodiments, hub 150 may have access to a preoperative context-specific 3D Model of anatomical structures 180 (hereinafter "Preoperative 3D Model"). Preoperative 3D Model 180 may be specific to the current (intraoperative) procedure being performed and may be patient-specific. Preoperative 3D model 180 may include information about anatomical structures likely to be encountered during the procedure including anatomical risk structures (e.g. organs, blood vessels, sensitive tissues, etc.) for patient 130. In some embodiments, preoperative CT scans 178A and/or preoperative MRI images 178B may be used to obtain preoperative 3D model 180. Preoperative 3D model 180 may include information pertaining to anatomical structures (e.g. including risk structures) including: (a) location and extent of the structures, (b) bio-mechanical/movement parameters for the anatomical risk structures, and (c) safety margins for the risk structures. The bio-mechanical/movement parameters may be patient specific (e.g. to patient 130 based on the patient's medical/physical condition) and/or typical (e.g. based on a population sample with characteristics similar to the patient or based on a population sample with characteristics similar to the relevant anatomical structure).

In some embodiments, in block 176, intra-operative 3D reconstruction may be performed (e.g., by MIS system 108 and/or hub 150). For example, MIS system 108 and/or hub 150 may be capable of real-time 3D reconstruction of the intraoperative environment based on the MIS system/endoscopic video feed. The term 3D reconstruction refers to the computation of a continuous surface representation from a set of discrete points (e.g., point cloud, a mesh of polygons, etc.) that retains important surface features and provides an acceptable approximation of the sampled surface in the presence of noise. When depth information is available (e.g., from a stereo MIS system), 3D reconstruction may be performed using stereo computer vision techniques. When passive stereoscopic images are obtained with pre-calibrated cameras, 3D reconstruction may be performed based on multiple images of the intraoperative environment by determining stereo correspondences of feature points in the images and triangulation based on the known camera parameters (e.g. geometry, focal length, etc.). Structural refinement may also be performed using filtering or priors on the shape of objects. Once a set of 3D points or point cloud is obtained (actively or passively), the points (in the point cloud) may be used to determine a volumetric scalar function to describe the surface, or points in the point cloud may be connected in a consistent manner to create a mesh surface representation, or a set of shape primitives may be combined so that their boundaries post-combination approximates the point set, or a set of patches may be fitted to the set of points, etc.

Various techniques may be used for 3D reconstruction (including when the camera is monocular (i.e. non-stereoscopic)), such as Shape from Shading (SfS), Shape from Motion (SfM), Deformable SfM, Shape from Template (SfT), Shape from Texture (SfTx), or a combination of the above techniques. Other techniques include ORBSLAM, which can estimate endoscope location, and 3D structure of the intraoperative environment. ORBSLAM may be used to reconstruct 3D maps of soft organs.

In some embodiments, MIS system 108/hub 150 may also run and/or receive input intraoperatively from a trained AI/ML model for 3D reconstruction 172, which may have been previously trained offline. For example, in some embodiments, MIS system 108/hub 150 may implement an AI/ML based approach and/or run previously trained AI/ML model for 3D reconstruction 172. In some embodiments, AI/ML model for 3D reconstruction 172 may use machine learning techniques for pair-wise patch matching. For example, multi-view (from multiple images) reconstruction may be performed by using a model based on a 3D recurrent neural network based on long-short-term memory (LSTM). LSTM has feedback connections that can process single images and sequences of images (e.g. video). As another example, AI/ML model for 3D reconstruction 172 may use a convolutional neural network (CNN) for 3D reconstructions such as SurfaceNet. SurfaceNet pre-computes the cost volume based on a voxel-wise view selection, and uses the trained 3D CNN based model to regularize and infer surface voxels. The term voxel refers to a data point in a 3D model that contains a position and a color value. As a further example, AI/ML model for 3D reconstruction 172 may be based on an unsupervised depth estimation framework such as END-flow. END-flow is based on an unsupervised optical flow network and trained offline on un-rectified stereoscopic videos without calibrated camera parameters. In some embodiments, 3D model of intraoperative anatomy (hereinafter "intraoperative 3D model") 174 may be output as a result of performing intraoperative 3D reconstruction (e.g., in block 180).

In some embodiments, in block 186, intra-operative 3D registration may be performed. For example, hub 150 may also register intraoperative 3D model 174 (e.g., obtained from intraoperative 3D surface reconstruction in block 180) with preoperative 3D model 180 (e.g., obtained preoperatively from preoperative CT scan(s) 178A and/or preoperative MRI images 178B). Registration of the intraoperative 3D model 174 and pre-operative 3D model 180 provides a uniform frame of reference, which may facilitate navigation and tracking of the MIS system camera and instruments. As one example, volume information from pre-operative pre-operative 3D model 180 (e.g. from CT scans 178A and/or MRI images 178B) may be used to facilitate surface-based registration. As another example, a surface mesh may be used for registration based on geometrical shape information. As an example, the shape of the surface of an organ (or of portions of the surface of the organ) may be determined intraoperatively (e.g. based on 3D surface reconstruction) and matched to a shape of the same organ in the pre-operative 3D model. In some embodiments, anatomical landmarks or anatomical feature points common to both intraoperative 3D model 174 and preoperative 3D model 180 may also be used to facilitate registration.

In some embodiments, MIS system 108/hub 150 may implement and/or use a context-aware system, which, based on the context (e.g., type of surgical procedure), may identify organs based on (a) segmentation by extracting homogeneous areas from an image (e.g., left image) of the stereo image pair, (b) classification of the segments by extracting textural and intensity features from the segmented image, (c) merging segments based on confidence scores assigned during the classification process. In some embodiments, a previously trained context-specific AI/ML model for semantic segmentation 182 may be used for determining segments. The term segmentation refers to the classification of pixels in an image as belonging to one or more semantic classes, which may be predefined. The term semantic class refers to a category (e.g. kidney, instrument, shaft, background, etc.) to which a pixel has been classed. In some instances, an output channel may be created for each class with pixels belonging to that class. Each output channel may be used as a mask to limit image operations to that class. Thus, in semantic segmentation each pixel of an image I may be labeled with one of S semantic classes.

Further, in some embodiments, a first imaging system (e.g. preoperative—ultrasound or CT scan device) and a second imaging system (e.g. intraoperative—endoscope) may be pre-calibrated to use a common reference frame. For example, a tracking system may be used establish a spatial relationship between the two imaging systems to facilitate 3D registration intraoperatively. As another example, makers (e.g., optical, electromagnetic, magneto-optic, etc.) may be used preoperatively (e.g., with a CT scan) and intraoperative systems (e.g., endoscope) to facilitate registration at a later time (e.g., intraoperatively).

In some embodiments, data and images (which may include 2D color images without depth information) from two or more imaging platforms may be fused and/or combined. For example, various 2D-3D registration algorithms may be used to facilitate data/image fusion. As one example, standard 2D-3D registration methods use a 2D projection view, an initial or estimated pose, and a 3D volumetric model, to register images and refine the registration. In some embodiments, trained deep learning models may be used to determine the initial or estimated pose and to facilitate registration and refinement based on various cost metrics such as normalized cross correlation, or binary cross entropy losses. For example, some embodiments may use an intensity-based deformable registration process, based on grid-based parameterization with B-splines or free-form deformations (FFDs) being used for parameterization.

In some embodiments, registered 3D anatomical model (hereinafter "registered 3D model") 184 may be output as a result of performing intraoperative 3D registration (e.g., in block 186). In some embodiments, registered 3D model may include and/or be associated with semantic classifications of pixels/voxels (e.g. object category associated with each pixel/voxel). As outlined above, semantic segmentation may include anatomical structure classification (e.g. blood vessels, lesions, tissue/organ type, fat, etc.) and/or instrument related classification (e.g. instrument type, sheath, etc.).

Further, in some embodiments, in block 190, 3D MIS instrument localization may be performed. For example, hub 150 may implement real-time MIS instrument localization 190 to determine the 3D pose of an MIS instrument. In some embodiments, the pose of the MIS instrument may be determined based on the pose of the MIS system camera. As outlined previously, the MIS instrument may be an energy device.

In some embodiments, instrument and/or camera pose may be determined (e.g. in block 190) using a previously trained AI/ML pose estimation model 188, which may facilitate instrument tracking and determine instrument pose. In some embodiments, the instrument detection and tracking model may be based on convolutional neural networks (CNNs). As one example, a CNN based AI/ML pose estimation model 188 may be used to detect and segment the instrument, prior to instrument pose estimation using mathematical (e.g. algebraic geometry) techniques. To segment the instrument, the CNN based AI/ML pose estimation model 188 may use an encoder and a decoder with pixel-wise classification. The encoder may include convolution and subsampling layers and perform feature extraction. The subsampling layers promote spatial invariance by reducing feature maps, which leads to more features being extracted at a lower computational cost. The decoder then projects the extracted features onto the pixel space to obtain a dense pixel-wise classification. To avoid loss of spatial resolution from subsampling, the CNN may use a skip connection that connects the last layer of the decoder with the original (full resolution) image via a series of depth-wise separable convolutions that do not subsample (i.e., a full resolution feature map generator).

CNNs for image classification typically use a "flatten layer" to vectorize arrays into a single long continuous linear vector. The flatten layer may be followed by several densely connected layers. Typically, a majority of the parameters used for image classification by the CNN arise from the densely connected layers, which can cause overfitting. In some instances, to prevent overfitting, a dropout layer may be used during CNN model training, which randomly sets half of the activation of the fully connected layers to zero. Further, the CNN may use a Global Average Pooling (GAP) layer, where only one feature map is generated for each corresponding classification category. GAP layers perform dimensionality reduction to avoid overfitting by reducing a height×weight×depth dimensional tensor to a 1×1×depth vector, which facilitates classification robustness in the presence of spatial translations. In some embodiments, the CNN may use depth-wise separable convolutions to limit network size, lower resource overhead, and facilitate real-time operation.

In some embodiments, instrument pose may then be determined by extracting the edges and a mid-line of the instrument. Edge detection techniques such as thresholding and Hough transforms may be used to determine the edges and mid-lines of the instrument, while the maximum pixel value may be used to determine the instrument tip, and the directional parameters $r\_3$ of the instrument axis may be determined from the intersection of the edge-lines and mid-line. The edge lines, mid-line, and instrument origin may form geometric primitives that may be used to determine pose. The instrument origin c may be determined as the 3D position where the instrument tip, when re-projected, matches the extracted instrument tip closely (e.g. using least squares or another appropriate error minimization technique). The pose determined above may be refined by minimizing the pixel intensities along the geometric primitives predicted by the geometric model and its 3D pose (e.g. minimizing the sum of squared intensities). Thus, in some embodiments, CNN based AI/ML pose estimation model 188 may be used to semantically segment the image and detect the instrument. In some embodiments, the CNN based model segmentation may also be used distinguish between sections of the instrument such as the actual tool (e.g. clasper, cauterizer, etc.) and other parts of the instrument (e.g. shaft, etc.). In some embodiments, a 6DoF MIS instrument pose 191 (hereinafter "instrument pose") may be output as a result of performing 3D MIS instrument localization (e.g., in block 190). In some embodiments, a pose uncertainty or pose error margin may be output along with instrument pose 191.

In block 193, instrument pose 191 may be used for continuous anatomical structure distance measurement. For example, in block 193, hub 150 may determine a distance between the MIS instrument and one or more identified anatomical features (or portions of the anatomical features). In some embodiments, the distance measurement may be context specific. For instance, extent of tissue movement (e.g. maximum or typical), pose measurement uncertainty may be factored into distance measurements. Tissue movement may depend on the tissues or organs proximate to the procedure being performed, organ parameters (such organ health, organ dimensions, etc.) and/or other patient parameters (e.g., physical parameters such as weight, height, etc. and medical parameters such as patient diagnoses, comorbidities, etc.). For example, the extent of intraoperative movement may be different for a liver relative to an intestinal tissue. As another example, the extent of intraoperative may be different for a diseased liver with a condition A relative to a healthy liver or one with a condition B. Thus, tissue movement parameters may be procedure specific, organ-specific, and/or patient-specific or a combination of the above. Pose uncertainty may be estimated based on typical error margins for the model used to determine instrument pose 191. In some embodiments, tissue movement parameters and pose estimation uncertainty may be factored into distance measurements to various identified anatomical features of interest.

In some embodiments, in block 190, based on the pose of the energy device, hub 150 may determine the distance between the energy instrument and anatomical risk structures (e.g. identified in registered intraoperative 3D model 184). In some embodiments, hub 150 may determine if an estimated distance is below a distance threshold (e.g. a specified safety margin for the procedure, anatomical structure, and/or instrument/energy device). The estimated distance and/or safety margin may account for potential tissue movement. For example, the distance threshold may be modified for a procedure (e.g. without changing estimated distance to the anatomical structure) to account for tissue movement. As another example, the distance estimation may be modified to account for pose estimation errors and/or tissue movement.

In block 195, MIS instrument state and/or tissue state may be determined based on sensor inputs 194. MIS instrument state determination may occur continuously (e.g., at frequent intervals) and/or in parallel with other blocks. Sensor input 194 may provide information about device activation, energy usage, energy emitted, temperature, jaw state, force, force distribution, pressure applied, tissue hydration, tissue state, etc. Sensors may include micro electro-mechanical sensors (MEMS), and may be integrated into MIS instruments and/or be part of one or more MIS subsystems. Sensors may include one or more of: force sensors including capacitive force sensors, (e.g. embedded into an instrument to determine clamping force. clamping force distribution, tissue state, etc.), micro-actuators, temperature sensors, microphones (e.g. which can provide audio input. audio may provide an indication tissue state such as tissue hydration, etc., which can change with tissue temperature), pressure sensors such as photonic crystal fiber (PCF) sensors or Fiber Bragg Grating (FBG) sensors, components to use scattering arising from FBG sensors, fiber optic pressure sensors, optical sensors (e.g. for photo plethysmographic (PPG)), etc. In some embodiments, sensor inputs may be used directly and/or input to models that may determine other instrument and/or tissue parameters based on the raw sensor input. Thresholds may be for one or more of the instrument parameters or tissue parameters outlined above. For example, a ceiling may be set for energy emitted, or a range for clamping force distribution, a ceiling for energy usage, a floor for tissue hydration, etc. The parameter thresholds may be customizable (e.g. for some parameters) by the medical professional and/or predetermined based on the procedure, tissue type, etc. (e.g. for some other parameters). In some instances, the parameter threshold may represent safety thresholds for a procedure, tissue type, and/or instrument. In some embodiments, sensory input may also be received (e.g., by hub 150) from instruments/sensors that are separate from the MIS. For example, one or more intraoperative patient parameters being monitored (e.g., blood pressure, heart rate, etc.) may be received (e.g., when these parameters are not determined by the MIS directly) as part of sensor input 194.

In some embodiments, block 195 may output information pertaining to one or more relevant MIS instrument states/tissue states 197 (e.g., instrument activation state(s), temperature, jaw open-closed state, energy usage, energy output, resonant frequency, tissue state, etc.). For example, in block 195, hub 150 may determine if one or more instrument state parameters (e.g. activation state, temperature, mechanical state, radiated energy, energy usage, etc.) exceed a corresponding instrument state parametric threshold. For example, hub 150 may determine if an energy device is activated and/or its temperature exceeds some threshold (e.g. 50° Celsius) and/or the amount/degree to which it exceeds the corresponding threshold. In some embodiments, block 195 may be performed independently during the procedure and relevant state information may be output to block 196.

In block 196, proximity and MIS instrument state based feedback may be determined and/or generated for the medical professional, which may be used to provide appropriate feedback (e.g., via HMD 140). For example, in instances when hub 150 determines that proximity to one or more anatomical structures is below a distance threshold and one or more device state parameters (e.g., activation state, temperature, mechanical state, radiated energy, energy usage, etc.) fall outside a corresponding parameter threshold, then a visual and/or auditory indication may be generated and provided via HMD 140 to the medical professional operating the MIS system as outlined further herein. Auditory indications may vary in tone and/or in the number of times a tone is played over a given time period, and/or in amplitude/volume, based on instrument state and/or proximity to anatomical structure. Visual indications may use AR to highlight elements and may also be color coded to reflect device state as outlined further herein. In some embodiments, the output of block 196 may include one or more of: an anatomical-structure-distance map (showing distance to relevant anatomical structures that lie within some threshold), parametric-threshold heat map (showing instruments that exceed a corresponding parametric threshold and the amount by which the threshold is exceeded), activation-state map (indicating active/inactive devices).

Referring to FIG. 1A, in some embodiments, hub 150 may include or be coupled to an AI engine, which may perform AI processing (including running one or more of the AI/ML models outlined in relation to FIG. 1B) locally. In some embodiments, AI information streams may also be received over network 165 and/or from cloud based services 175. Cloud based services may be hosted on private clouds, public clouds, and/or hybrid public-private clouds. AI functionality may be distributed between hub 150, computing devices, and other devices on hospital network 170, and cloud 175. For example, hub 150 may run the AI/ML and other models outlined herein to provide AI based decision-support, video annotations etc., whereas AI related data may be de-identified (e.g. for patient privacy and regulatory reasons) and stored locally and/or on devices coupled to hospital network 170, while machine learning models may be trained and/or improved using the de-identified collected data using AI related applications provided on cloud 175.

In some embodiments, as shown in FIG. 1A, example hub 150 may include a touchscreen display 165, which may be used to present user-interface (UI) to enable medical professional 120 to select input streams, select AI models to run, and configure other functionality such as display of endoscopic images, reception of sensor data, provide power to devices, and/or control instruments and/or devices coupled to hub 150. In some embodiments, touchscreen 165 may be detachable and capable of being wirelessly coupled to base unit 155 of hub 150. In some embodiments, touchscreen 165 may form part of a tablet computer and/or other mobile computing device and processing capability may be distributed between base unit 155 and the tablet or mobile computer that houses touchscreen 165. In some embodiments, base unit 155 may also serve as a docking station for touchscreen 165 and or other tablet computers and/or mobile computing devices.

In some embodiments, hub 150 may serve as a Wireless Access Point (WAP) and broadcast its own local network 160-1, which may be used by authorized devices (e.g. within the operating room and/or within range). Authorized devices may be connect to hub 150 (serving as a WAP) over network 160-1 and may be communicatively coupled to hub 150 over network 160-1. Hub centered network 160-1 may insulate various intraoperative devices in the operating room or in proximity to the operating room from wireless network outages, signal reception issues, bandwidth related issues, etc. that may occur in the wireless network provided by the hospital (e.g. hospital network 170) or medical facility. Thus, hub centered network 160-1 may facilitate increased bandwidth and lower latencies between intraoperative devices that are coupled to hub 150 and improve information sharing including video, images, graphics, and/or other information, while maintaining privacy. For example, hub 150 may receive images from an intraoperative imaging device (e.g. such as a fluoroscopic camera) in the operating room (OR) over network 160-1 and may display the image on display 135-1. As another example, hub 150 may send graphics and/or user-interface (UI) information for display on tablet computer 145. Medical professional 120-1 may use the UI remotely to configure hub 150 and/or one or more devices that are coupled to hub 150 over network 160-1.

Figure 2A:
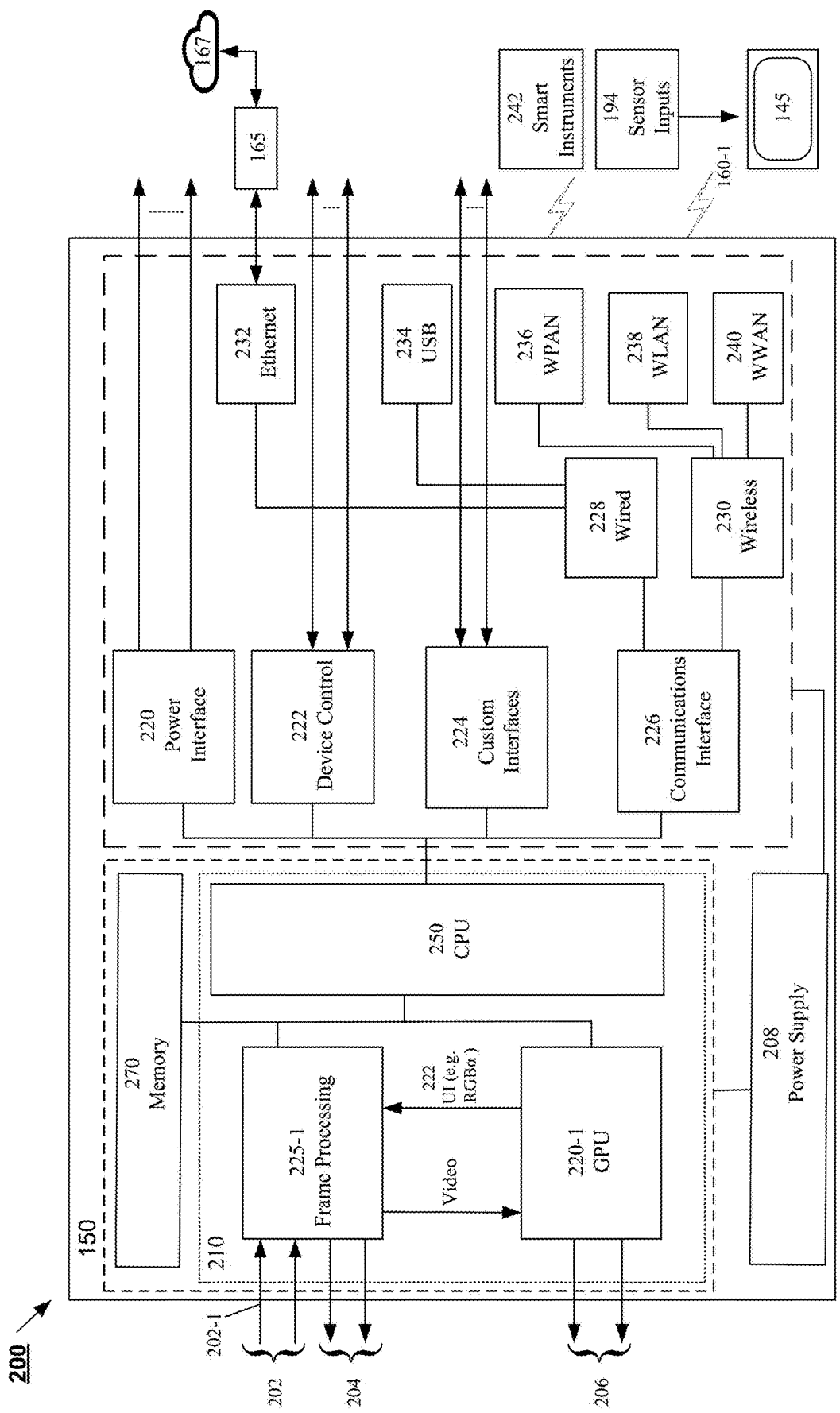
FIGS. 2A and 2B show schematic block diagrams of example embodiments of apparatus to facilitate instrument tracking and intraoperative visualization.
Figure 2B:
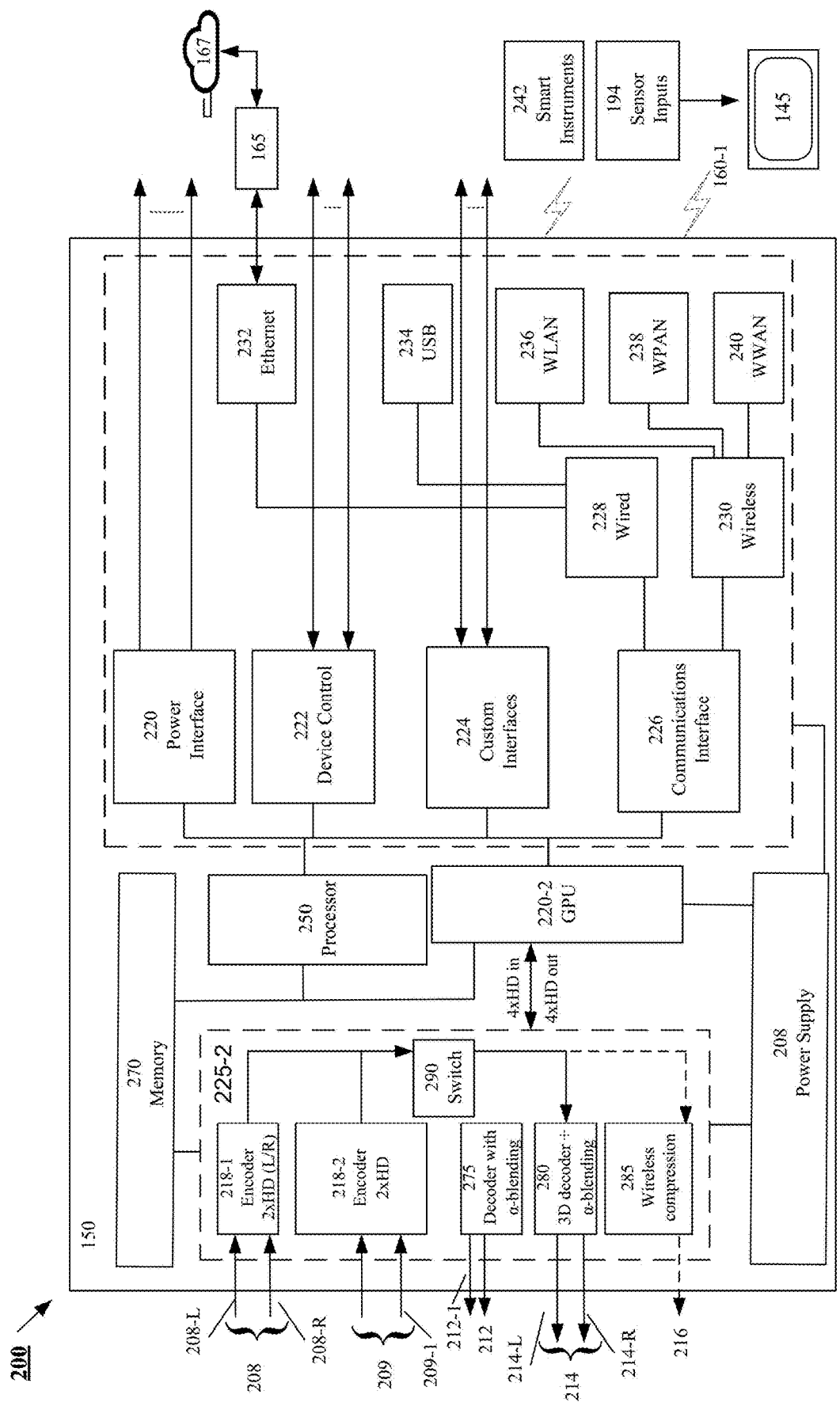

FIGS. 2A and 2B are schematic block diagrams 200 of an example system illustrating functional components of embodiments of an apparatus (such as example hub 150) that facilitates fault-tolerant intraoperative visualization. The term processor as used herein may refer to any combination of frame processing engine (FPE) 255-1, and/or GPU 220-1, and/or CPU 250 (e.g. as in FIGS. 2A and 2B).

As shown in FIG. 2A, frame processing engine (FPE) 255-1 in hub 150 may receive a plurality of input video streams 202 (e.g. High Definition (HD) video streams, for example, from an endoscope or ultrasound device). The input video streams 202 may include a first input video stream 202-1, which may correspond to a video stream associated with a procedure currently being performed by medical professional 120-1. The input video streams 202 may be provided over standard interfaces (e.g. such as High Definition Multimedia Interface (HDMI) or Serial Digital Interface (SDI), etc.) or custom interfaces. HD video may include 10-bit 4K video such as, for example, of resolution 3840×2160 pixels (which is also referred to as 2160p), 1920×1080 pixels (also referred to as 1080p video), and 1280×720 pixels (also referred to as 720p video) with a frame rate of 59.94 and/or 60 image frames per second (fps).

FPE 225-1 may also be capable of output of video streams 204. In some instances, the number of output channels may mirror the number of input channels and output video streams 204 may mirror the resolution and frame rate of the input video streams 202. Output video streams 204 may be transmitted over the HDMI and/or SDI interfaces. In some embodiments, output video streams 204 may also be transmitted wirelessly (e.g. over a Wireless Local Area Network (WLAN)) associated with hub 150. FPE 225-1 may include and/or be coupled to memory 270. Memory 270 may include a plurality of frame buffers (not shown in FIG. 2A), which may be used to store graphics frames and/or video frames. Graphics frames may be received with an "alpha" channel (e.g. as Red-Blue-Green-alpha or "RGBα"), which may indicate the degree of transparency associated with each pixel. The alpha channel may be separate or pre-multiplied. Graphics frames (e.g. UIs) may be received from Graphics Processing Unit (GPU) 220-1.

In some embodiments, memory 270 may hold a plurality of frame buffers for each input video stream. In some embodiments, each frame buffer may be configured to be of the same size as the input video stream being processed. Video and graphics information in frame buffers associated with a channel may be blended based on the alpha information (e.g. in the graphics stream) and output by FPE 225-1. In some embodiments, memory 270 may also hold data, program code, models including one or more of pre-operative 3D model 180, intraoperative 3D model 174, registered 3D anatomical model 184, AI/ML model for semantic segmentation 182, AI/ML model of pose estimation 188, and/or some combination of the above.

In some embodiments, FPE 225-1 may be implemented using an Application Specific Integrated Circuit (ASIC), a Field Programmable Gate Array (FPGA) add-on board, and/or using some combination of hardware, software, and firmware. As one example, FPE 225-1 may use FPGAs in an M2 form factor and use the Peripheral Component Express (PCIe) interface to communicate with GPU 220-1 processor 250 and/or other components on hub 150. PCIe is a high-speed serial computer expansion bus standard. In the embodiment above, FPE 225-1 may be added as a solution to an existing computing platform such as a PC. For example, FPE 225-1 (e.g. as an add-on PCIe component) may be used to add functionality disclosed herein to an existing computing platform that may lack features disclosed herein. In some embodiments, FPE 225-1 and other hub components may receive power from Power Supply 208, which may be compliant with the IEC 60601-1 standard for medical equipment. IEC 60601-1 is a series of standards related to the basic safety and essential performance requirements of medical electrical equipment.

GPU 220-1 may perform graphics and AI processing. For example, GPU 220-1 may include Tensor Processing Units (TPUs) or tensor cores, which may be capable of running AI models (e.g. one or more of pre-operative 3D model 180, intraoperative 3D model 174, registered 3D anatomical model 184, AI/ML model for semantic segmentation 182, AI/ML model of pose estimation 188, and/or some combination of the above), graphics processing including 3D graphics, video rendering, etc. GPU 220-1 may be able to receive and process video input from FPE 225-1 and pre-operative and intra-operative images related to patient 130. AI applications running on GPU 220-1 may process the received input to determine and mark blood vessels, bleeding, etc. in frames. In some embodiments, GPU 220-2 may provide graphics and/or UIs and/or augmentations in real-time to FPE 225-1, which may be provided to medical professionals 120 intraoperatively as decision support, guidance, warnings, etc. using annotations/augmentations to video. GPU 220-1 may also receive video input from FPE 225-1, which may be displayed along with any augmentations on displays 135-1, 115 (FIG. 1A) and/or on tablet 145.

Although shown as separate from FPE 225-1, functionality associated with one or more of GPU 220-1, processor 250 and memory 270 may be combined with FPE 225-1 (e.g. as single component, chip, or card), or be external to FPE 225-1. For example, memory 270 may be distributed across hub 150 so that one or more components such as processor 250, FPE 225-1, and/or GPU 220-1 may each include local memory and may also access a main or system memory. Further, memory 270 may include primary and/or secondary memory.

Program code, data, images, configuration information, graphics, image and video frames, models—including AI models, etc. may be stored in memory 270, and read and/or executed by one or more of FPE 225-1, GPU 220-1, and/or processor 250 to perform the techniques disclosed herein. As used herein, the term "memory" refers to any type of long term, short term, volatile, nonvolatile, or other memory and is not to be limited to any particular type of memory or number of memories, or type of media upon which memory is stored. Examples of storage media include computer-readable media encoded with databases, data structures, etc. and computer-readable media encoded with computer programs. Computer-readable media may include physical computer storage media. A storage medium may be any available medium that can be accessed by a computer. By way of example, and not limitation, such computer-readable media can comprise Random Access Memory (RAM) and variations thereof including Non-Volatile RAM (NVRAM), Read Only Memory (ROM) and variations thereof Erasable Programmable (EPROM), Flash Memory, etc. Computer-readable media may also include Compact Disc ROM (CD-ROM), memory cards, portable drives, or other optical disk storage, magnetic disk storage, solid state drives, other storage devices, or any other medium that can be used to store desired program code in the form of instructions and/or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Communications interface 226 may be capable of wired (e.g. using wired communications interface 228) or wireless (e.g. using wireless communication interface 230) communications with another device (e.g. HMD 140) and may be used to receive sensor inputs 194, communicate with smart instruments 242, and/or external networks such as hospital network 165 (FIG. 1)).

Captured images, AI models, instrument state, sensor inputs 194, input from smart instruments 244, robot data, etc., may be received over communications interface 226. User input (e.g. received from tablet 145) may also be received and confirmations/messages transmitted using communications interface 226. Wireless communication may include communication using one or more of: Wireless Local Area Network (WLAN) interface 238 (e.g. with tablet 145, display 140, over Wi-Fi etc.), which may be based on the IEEE 802.11 standards, and/or over Wireless Wide Area Networks (WWAN) interface 240 (e.g. with a remote mobile device, cloud based edge server over cloud 175, etc.), which may be based on cellular communication standards such as a Fifth Generation (5G) network, or Long Term Evolution (LTE), and/or over Wireless Personal Area Networks (WPAN) interface 236 (e.g. with audio devices, some proximate smart instruments 242, etc.), which may be based on IEEE 802.11x (e.g. using Bluetooth, etc.).

In some embodiments, cloud based applications, AI models, pre-operative and intra-operative images, etc. may be downloaded by a processor using wired interface 228 from one or more devices coupled to hub 150 over USB interface 234, and/or servers coupled to hospital network 165 over Ethernet 232, and/or from cloud based servers coupled to cloud 167 over Ethernet 232.

In some embodiments, processor may also send commands to control devices based on input received from a medical professional 120, or based on instrument state, sensor input, configuration settings, etc. using device control interface 222 or over communications interface 226. Power interface 220 may be enabled by processor 150 to supply power to one or more instruments, sensors, and/or other devices coupled to hub 150. Hub 150 may receive power from power supply 208, when plugged in and, in some embodiments, may include backup battery power.

Processor 150 may also communicate with devices (e.g. robotic or other devices) over custom interfaces 224, which may be proprietary. In some embodiments, processor may also run program code to control operation of hub 150, log events, notify medical personnel (e.g. via messages), store data, images, sensor input, pull up patient records from databases (local or networked), facilitate maintenance of synchronization for multi-media operations, provide support for the Digital Imaging and Communications in Medicine (DICOM) and other standards, facilitate access to cloud based services etc. For example, based on user input and configuration information, processor 150 may log and record a procedure performed using an endoscope for replay (e.g. for training and/or review) and/or analysis (e.g. to train a machine learning/AI model) at a subsequent time. As another example, processor 150 may facilitate the live streaming of the procedure via communications interface 226 (e.g. for educational or training purposes). DICOM is a standard for communication and management of medical imaging information and related data between devices.

The methodologies described herein may be implemented in hardware, firmware, software, or any combination thereof. For a hardware implementation, processor 250, FPE 225, GPU 220 may be implemented within one or more application specific integrated circuits (ASICs), TPUs, digital signal processors (DSPs), image processors, digital signal processing devices (DSPDs), programmable logic devices (PLDs), field programmable gate arrays (FPGAs), processors, controllers, micro-controllers, microprocessors, electronic devices, other electronic units designed to perform the functions described herein, or any combination thereof. Processor 250 and GPU 220 may also include functionality perform other well-known computer vision and image processing functions such as feature extraction from images, image comparison, image matching, object recognition and tracking, image compression and decompression, mixing—including line-wise mixing, alpha blending, etc. The components and/or blocks shown in FIGS. 2A and 2B (e.g. processor 250, GPU 225, FPE 220, memory 270, communications interface 226, etc.) may be coupled using buses, interfaces (e.g. PCIe, etc.), wired connections, etc.

FIG. 2B is a schematic block diagram 200 of an example system illustrating functional components of another embodiment of an apparatus (such as example hub 150) that facilitates intraoperative visualization. Components with similar labels function in a manner similar to that described in FIG. 2A. The description of FIG. 2B describes an embodiment reflecting some changes in function, behavior, or interaction of functional blocks and/or components relative to FIG. 2A.

As shown in FIG. 2B, encoder 218-1 may receive and encode 3D HD video stream 208 (e.g. from a 3D or stereoscopic camera associated with endoscope), which may include a left video channel 208-L and a right video channel 208-R each at 60 fps. Further, as shown in FIG. 2B, encoder 218-2 may receive and encode 2 separate HD video streams 209 (e.g. from a C-arm extension camera and an ultrasound device) each at 60 fps. Switch 290 may receive encoded input video streams 208 and 209 as well as graphics input from GPU 220-2 in the form of RGBα streams (an RGB stream with an α channel). As shown in FIG. 2B, switch 290 may be capable of sending 4 HD input streams each at 60 fps and receiving 4 HD graphics RGBα streams each at 60 fps to/from GPU 220-2. Switch 290 may be configured to send encoded input stream 208 and RGBα stream to 3D decoder with alpha blending 280. Similarly, switch 290 may be configured to send encoded input streams 209 and RGBα stream to decoder with alpha blending 275 and/or to compression and wireless transmission block 285.

In some embodiments, for example, when a blended (graphics and video) frame output by 3D decoder with alpha blending 280 frame incorporates input video channels 208, the blended streams may output as 3D video stream 214 (e.g. to HMD 140), which may include a left video channel 214-L and a right video channel 214-R each at 60 fps. As another example, when a blended (graphics and video) decoder output by decoder with alpha blending 275 frame incorporates input video channels 209, the blended streams may output as HD streams 212 each at 60 fps.

As shown in FIG. 2B, FPE 225-2 may also include wireless compression block 285, which may compress one or more of the input streams for wireless transmission. In FIG. 2B, for simplicity, stream 216 is shown as being output by wireless compression block 285. However, stream 216 may be sent to communication interface 226 by wireless compression block 285, and then output using wireless communication interface 230 and/or WLAN interface 236.

Figure 3A:
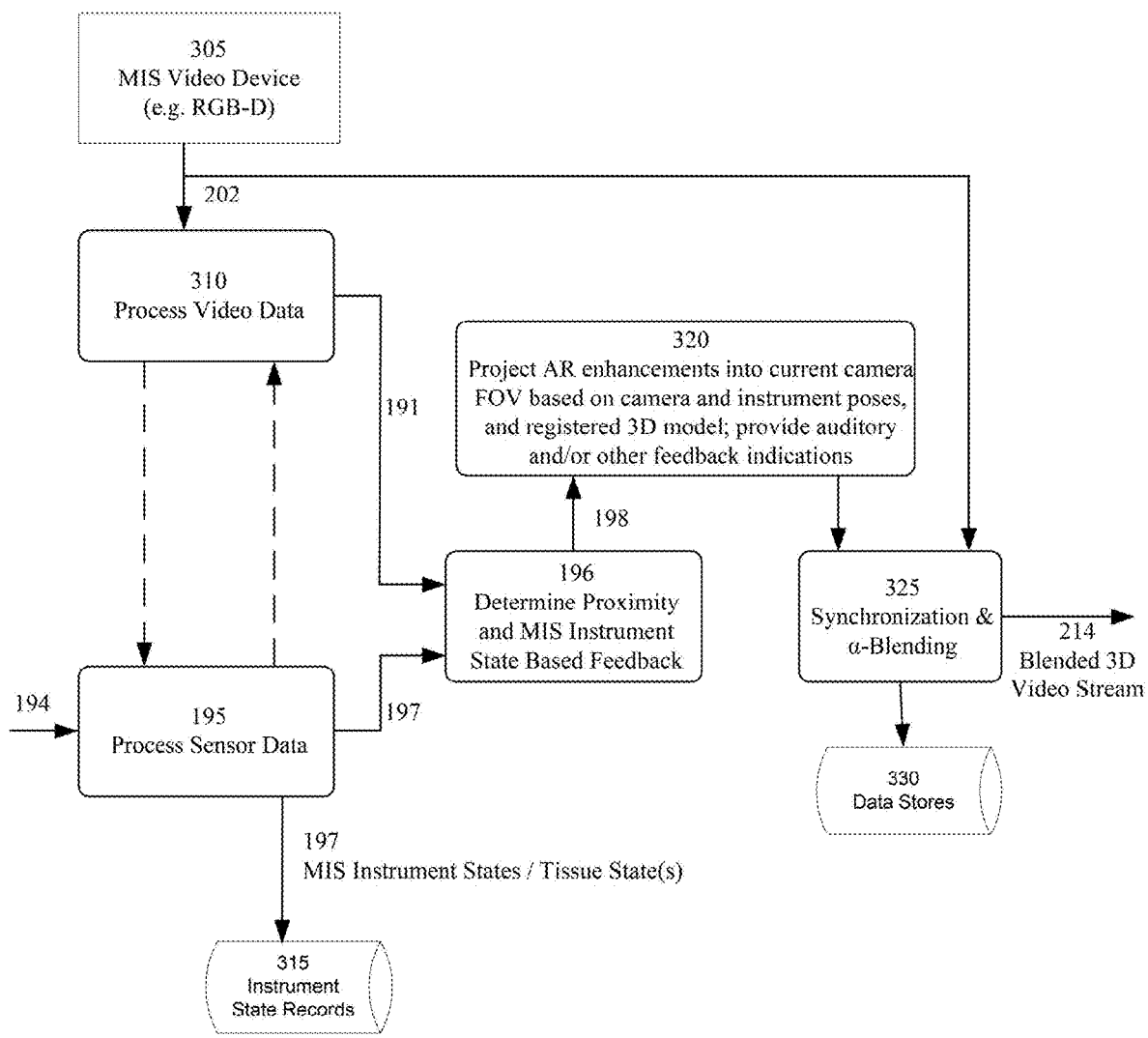
FIG. 3A shows a schematic block diagram 300 illustrating example high level signal and data flow between functional blocks to facilitate intraoperative visualization.

FIG. 3A shows a schematic block diagram 300 illustrating example high level signal and data flow between functional blocks to facilitate intraoperative visualization. In some embodiments, one or more of the functional blocks may form part of a device (e.g., MIS system 108/hub 150) to process information received from various MIS subsystems (e.g., endoscope, instruments, sensors, etc.) to facilitate providing user feedback (visual, audible, tactile, etc.). In some embodiments, some user feedback may be provided using HMD 140.

In some embodiments, hub 150 and/or HMD 140 may be housed separately but may be operationally coupled to an MIS system 108. In other embodiments, hub 150 and/or HMD 140 may form part (e.g., be a subsystem) of an MIS system 108. Thus, in some embodiments, hub 150, HMD 140 may form part of a single (functionally) integrated MIS system 108 and the MIS system 108 may include the functionality described herein in relation to hub 150 and/or HMD 140.

In some embodiments, block 310 may process input video data 202 (e.g., from a stereoscopic video device such as MIS video device 305 (which may include color and depth e.g., RGB-D information). In some embodiments, example block 310 may include functionality provided by blocks 172 through 190 (e.g. in FIG. 1B) and may output instrument pose 191 (which, in some instances, may include a pose uncertainty). In some embodiments, block 310 may also receive sensor data (as indicated by the dashed line from block 195 to block 310), which may be used during video processing in block 310. For example, in some instances, information from sensors (e.g. ultrasonic sensors, etc.) may be used in the determination of instrument pose.

In FIG. 3A, in some embodiments, block 195 may receive and process sensor input 194 (e.g., as outlined above in relation to FIG. 1B) and may output information pertaining to one or more relevant MIS instrument states 197 (e.g., instrument activation state(s), temperature, jaw open-closed state, energy usage, energy output, etc.). For example, in block 195, hub 150 may determine: (a) an instrument state and/or (b) if one or more instrument state parameters (e.g. activation state, temperature, mechanical state, radiated energy, energy usage, etc.) exceed (i) a corresponding instrument state parametric threshold, and/or (ii) the amount/degree to which the corresponding parametric threshold is exceeded. The amount/degree to which the corresponding parametric threshold is exceeded may be expressed in a manner appropriate for the corresponding instrument state parameter. Instrument states and other information may be stored/logged in instrument state records database 315.

Figure 3B:
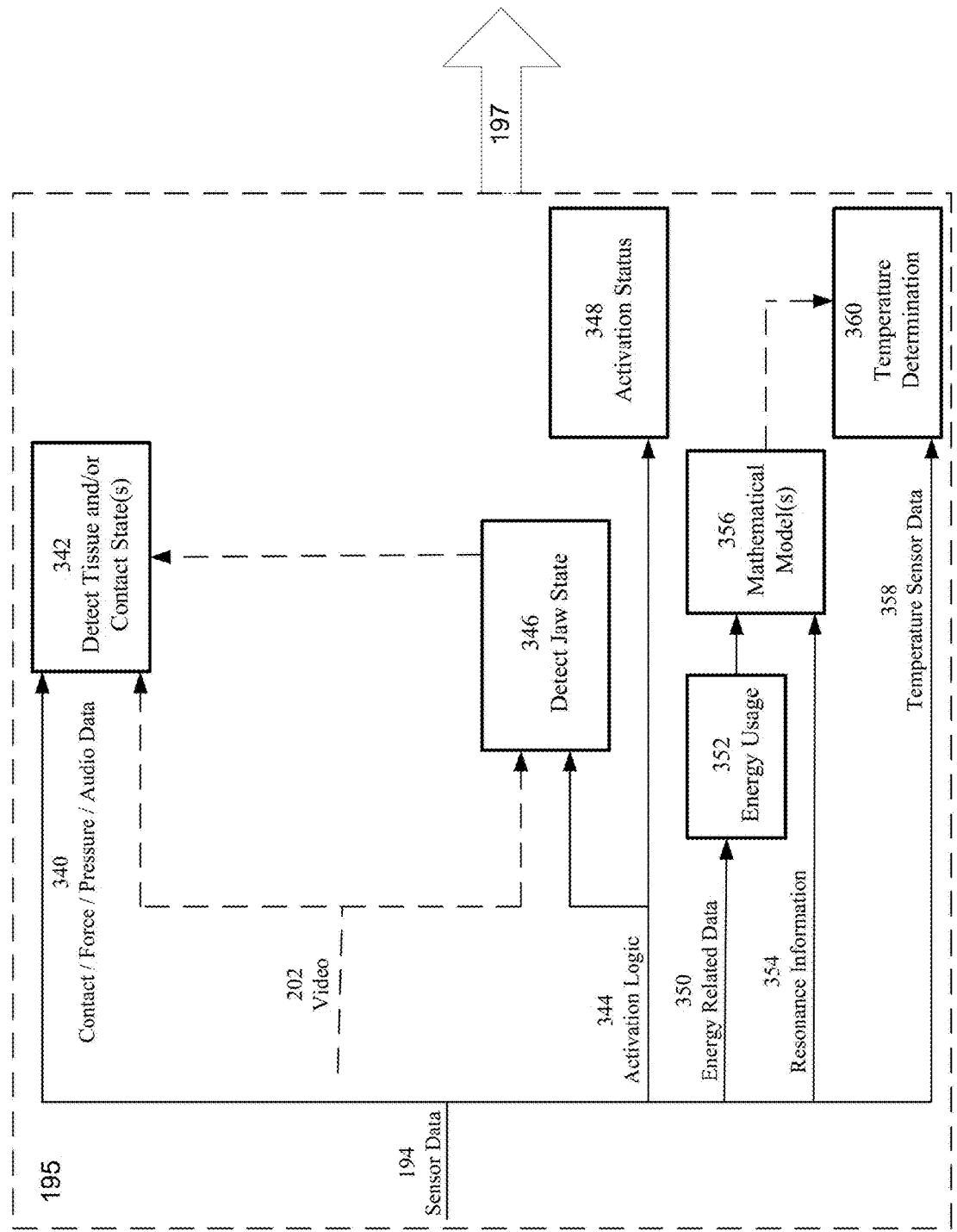
FIG. 3B details aspects of an example block to receive and process sensor input.

FIG. 3B details aspects of example block 195 to receive and process sensor input 194. Referring to FIG. 3B, in block 360, temperature sensor data 358 may be used to determine the temperature of one or more MIS instruments and/or the amount by which corresponding temperature thresholds for the instruments are exceeded. For example, an MIS instrument $I\_1$ may have a corresponding temperature threshold $H(I\_1)$. Further, instrument $I\_1$ may be determined to be at temperature $T(I\_1)$ and/or the amount by which the corresponding temperature threshold $H(I\_1)$ is exceeded may be determined. The amount may be expressed a difference (e.g., $T(I\_1)-H(I-1)$), or as a ratio (e.g., $(T(I\_1)/H(I\_1))$, or by another mathematical function.

In some instances (e.g., when temperature sensors associated with an MIS instrument are active only when the MIS instrument is active, or the MIS instrument lacks temperature sensors), then mathematical model(s) 356 may be used to predict an instrument temperature post-activation even in situations when direct sensory input (e.g., from a temperature sensor) is limited or unavailable. For example, some energy device may generate heat by oscillating an instrument (such as a blade) against tissue at various power levels (high, low, etc.). A generator and circuitry may control power that actuates the instrument and may provide information pertaining to input voltage, input current, resonance state, and the resonance frequency at the instrument when activated at high power. At high power, the blade rapidly generates heat, which may be used to seal tissue grasped by the instrument. In a low power or inactive state, the instrument cannot generate sufficient heat for sealing and may be in a cooling mode (e.g. paused for cooling to avoid tissue damage before the device is used again for tissue manipulation, etc.). If the instrument(s) do not have temperature sensing technology in place, then conventionally, the actual temperature of the instrument(s) cannot be determined. Thus, temperature estimation and safe MIS device use may depend entirely on the experience level of the surgeon, which can lead to errors.

In some embodiments, mathematical models 356 may use MIS instrument physics and/or other sensory input such as resonance information 354 (e.g., resonance state and/or resonance frequency) to determine instrument temperature. Mathematical model 356 may determine instrument temperature (e.g., whether an MIS instrument is hot enough for sealing or cold enough to perform tissue manipulation post deactivation without risk of thermal injury), thereby increasing surgical safety and surgical efficiency (by eliminating unnecessarily long wait times) and surgical focus (e.g., by reducing cognitive overhead associated with peripheral tasks). Mathematical model 356 may be used to determine or estimate instrument temperature even in instances when temperature sensor data is unavailable.

When MIS instrument is active, energy related data (e.g., input current, input voltage, device characteristics, etc.) and/or MIS device resonance information 354 (e.g., resonance state, resonance frequency, etc.) may be used to determine temperature. Further, mathematical model 356 may also determine MIS instrument temperature based on resonance information 354 such as resonance state and resonance frequency, after the instrument has been deactivated following high power sealing. For example, mathematical model 356 may predict instrument temperature based on resonance information 354 such as the input resonance state and resonance frequency (which correlates with instrument temperature).

In some embodiments, activation logic data 344 may be used by activation state block 348 to determine MIS instruments that are currently active. In some embodiments, a more specific activation state may be determined. For example, based on activation logic data and/or sensor input, detect jaw state block 346 may determine whether a grasper jaw is open or closed.

In some embodiments, other functional blocks such as detect tissue and/or contact state block 342 may detect an MIS instrument contact state and/or a tissue state based on input from one or more sensors such as contact sensors, proximity sensors, force sensors, pressure sensors, audio sensors, etc. For example, in block 342, audio sensory input from microphones may be used to sense sizzling and estimate tissue state such as the hydration content of the tissue. As another example, audio sensory input from microphones may be used to sense heartbeat and/or heart rates. As a further example, in block 342, changes in grasping force may be compared to the degree of jaw open/close (e.g., received from block 346), which may be used to determine tissue stiffness and/or determine tissue type. Contact sensors and/or proximity sensors may be used to determine whether an MIS instrument is in contact with tissue. Force sensors and/or pressure sensors may also be used to determine the distribution of forces applied by an MIS instrument. As shown in FIG. 3B, in some embodiments, block 195 may also receive video data (as indicated by the dashed line from block 310 to block 195), which may be used during sensor state processing in block 195. For example, in some instances, video information may be used instead of or in addition to sensor data 194 to determine instrument state (e.g., jaw open/closed, etc.).

The blocks shown in FIG. 3B are merely examples and various other functional blocks may be present based on the procedure being performed and/or MIS instruments used during a procedure. Further mathematical model 356 shown in FIG. 3B is merely an example. In general, various mathematical/physical models may be used to determine other instrument state and/or tissue parameters based on available sensor input 194. Although shown as a separate block in FIG. 3B, mathematical models (such as mathematical model 356) may be integrated into any functional block to determine and/or refine parameter estimation from sensory input. MIS instrument states/tissue states 197, which may include parameter values, corresponding parameter thresholds, tissue states, etc. may be output by block 194.

Referring to FIG. 3A, in block 196, proximity and MIS instrument state based feedback may be determined and/or generated (e.g., for display/output by HMD 140) and as outlined above in relation to FIG. 1B. When proximity to one or more anatomical structures is below a distance threshold and one or more device state parameters (e.g., activation state, temperature, mechanical state, radiated energy, energy usage, etc.) fall outside a corresponding parameter threshold, then a visual and/or auditory indication and/or haptic indication may be generated and provided (e.g., via HMD 140) to the medical professional operating the MIS system as outlined further herein.

Figure 3C:
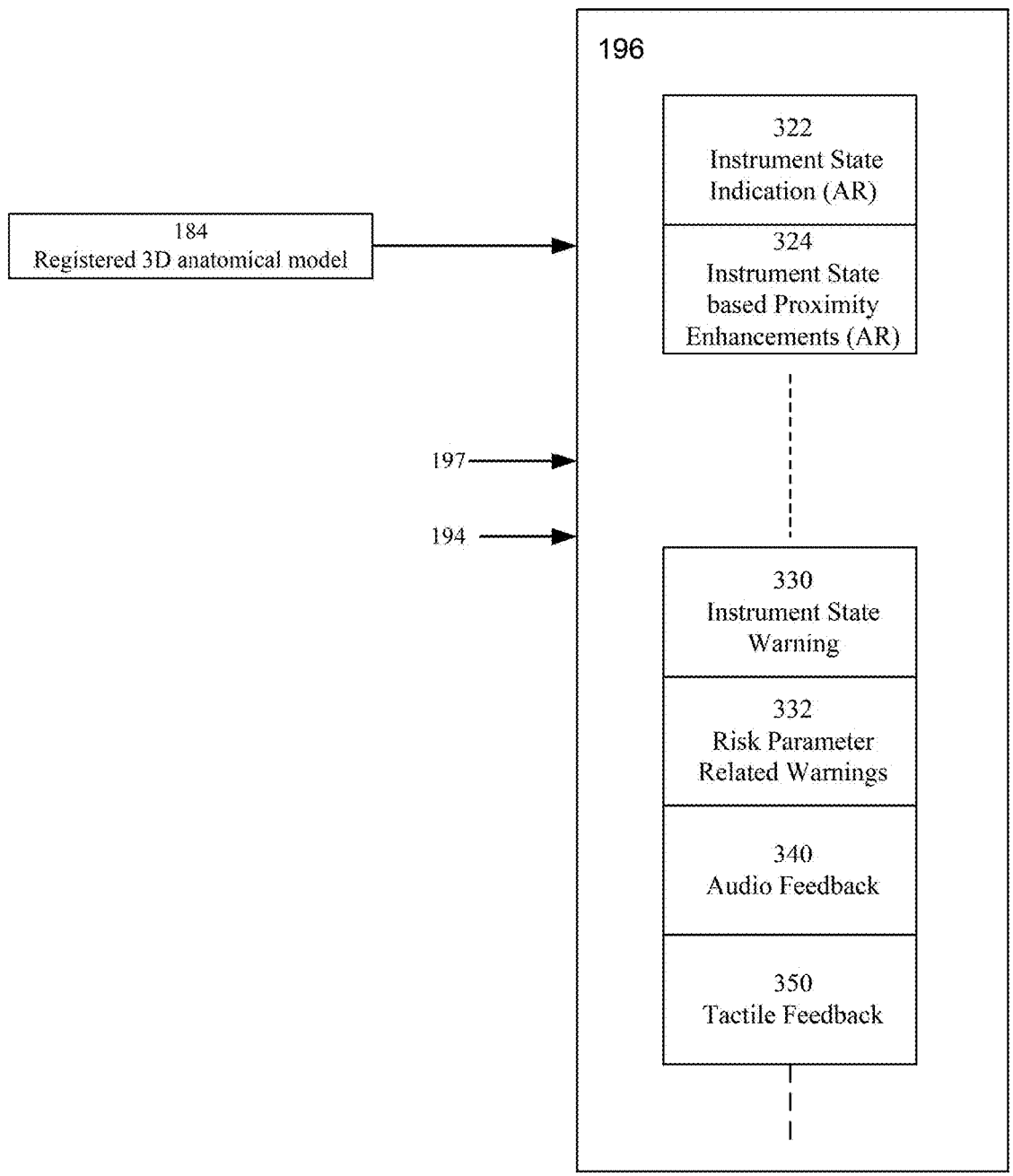
FIG. 3C shows some example functional blocks associated with a block to determine proximity and MIS instrument state based feedback in accordance with certain embodiments disclosed herein.

FIG. 3C shows some example functional blocks associated with block 196 in accordance with certain embodiments.

In some embodiments, instrument state indication block 322 may determine instrument states based on information in MIS instrument and tissue states 197. For example, instrument state indication block 322 may semantic segmentations associated with registered 3D model 184 to determine pixels/voxels associated with one or more MIS instruments. In some embodiments, pixels/voxels associated with MIS instruments may be enhanced (or marked for enhancement) based on their activation state, parameters (e.g., instrument temperature), and/or amount or degree to which the instrument state exceeds a corresponding parametric threshold. For example, pixels associated with an instrument may be color coded or highlighted based on the activation state and temperature of the instrument. The enhancements may be performed using a mask so that other pixels/voxels (i.e., not associated with the MIS instrument(s)) remain unaffected by the operations in block 322.

In some embodiments, instrument state based proximity enhancements block 324 may determine anatomical structures of interest (e.g., pixels/voxels associated with anatomical structures such as blood vessels, organs, sensitive tissue, etc.) in registered 3D model 184 that are within some distance threshold of MIS instruments with at least one parameter that falls outside one or a corresponding instrument state parametric threshold. For example, block 324 may determine a set of MIS instruments with at least one parameter that falls outside one or a corresponding instrument state parametric threshold Further, semantic segmentations associated with registered 3D model 184 may be used to determine sets of pixels/voxels associated with anatomical structures, and the current instrument pose(s) 194 may be used to determine subsets of proximate pixels/voxels that are also associated with one of the sets of anatomical structures. The proximate pixels/voxels may lie within some distance of the set of MIS instruments. For example, instrument state based proximity enhancements block 324 may determine anatomical structures that fall within some distance threshold of MIS instruments with a temperature exceeding 50° C. In some embodiments, the subsets of proximate pixels may identified pixels/voxels may be enhanced or marked for enhancement. The enhancements may include color coding and/or highlighting pixels in the subsets of proximate pixels based on distance. The enhancements may also distinguish pixels associated with distinct anatomical structures. The enhancements may be performed using masks so that other pixels/voxels (i.e., not determined to be proximate to an instrument in the set of MIS instrument(s)) remain unaffected by the operations in block 324. In some embodiments, based on MIS device settings or configuration (e.g., by a surgeon), anatomical structures of interest may be enhanced at various times during a procedure or throughout the procedures. When anatomical structures of interest are highlighted as above, instrument state based proximity enhancements block 324 may use additional distinguishing enhancements to differentiate pixels in the subsets of proximate pixels.

In some embodiments, instrument state warnings block 330 may initiate display of alerts/warnings based on instrument state. For example, block 330 may initiate the display of an alert/warning or text message related to an instrument state (e.g. jaw opened or closed).

In some embodiments, risk parameter related warnings block 332 may initiate display of warnings based on amount or degree to which instrument states exceed a corresponding parametric threshold. For example, the display of an alert/warning or text message related to one or more risk parameters may be initiated (e.g. instrument I_1 temperature exceeds 50° C.).

In some embodiments, audio feedback block 340 may initiate or enable the provision of audio feedback. For example, audio may provide an indication tissue state such as tissue hydration. In addition, audio feedback indication may be provided based on instrument state and/or proximity to anatomical structure. The audio feedback may indicate that the feedback be varied in tone and/or in the number of times a tone is played over a given time period, and/or in amplitude/volume based on instrument state and/or proximity to anatomical structure. Audio feedback may be provided using HMD 140.

Further, in some embodiments, 350 tactile feedback block may initiate the provision of haptic and/or tactile feedback. For example, tactile/haptic feedback may be provided using handheld controls used by the surgeon/medical professional.

In some embodiments, the output of block 196 may include one or more of: an anatomical-structure-distance map (showing distance to relevant anatomical structures that lie within some distance or proximity threshold), parametric-threshold heat map (showing instruments that exceed a corresponding parametric threshold and the amount/degree to which the threshold is exceeded), activation-state map (indicating active/inactive devices). The maps above may be based on registered 3D model 184.

In some embodiments, registered 3D model may include and/or be associated with semantic classifications of pixels/voxels (e.g. object category associated with each pixel/voxel). Semantic segmentation may include anatomical structure classification (e.g. blood vessels, lesions, tissue/organ type, fat, etc.) and/or instrument related classification (e.g. instrument type, sheath, etc.). Based on MIS instrument pose 191, a set of proximate pixels/voxels in the registered 3D model that lie within some distance threshold may be determined. Pixel/voxels in the first proximate set that are associated with anatomical structures of interest may be identified and an anatomical-structure-distance heat map may be determined. The anatomical-structure-distance heat map may include one or more subsets, where each subset includes pixels/voxels that are associated with anatomical structures of interest and lie within some range of the instrument. In some embodiments, masks may be generated corresponding to pixels/voxels in each subset so that operations on the pixels/voxels in the corresponding subset may be carried out without affecting any other pixels.

Referring to FIG. 3A, in block 320, AR enhancements may be projected into current camera FOV based on camera and instrument poses, and the registered 3D model. In some embodiments, block 320 may output the AR enhancements and other warning/alerts as RGBα stream 222.

For example, pixels/voxels that are: (i) in the current FoV of the camera, and (ii) associated with anatomical structures of interest, and (iii) lie within some distance threshold of an instrument, where (iv) the instrument state falls outside some corresponding parametric threshold may be enhanced. In addition, one or more instruments in the current FoV may also be enhanced based on instrument state. For example. one or more instruments in the current FoV may be color coded based on their current state (e.g., active, active state outside parametric threshold, inactive, etc.). Further, pixels associated with anatomical structures of interest in the current FoV and that lie within some distance threshold of an instrument where the instrument state falls outside some corresponding parametric threshold may be color coded based on their distance from the instrument.

In block 325, the output of block 320 may be a 3D blended video stream (such as video stream 214 in FIG. 2B). 3D video stream 214 may be a synchronized and blended (e.g. using α-blending) stream, which blends the input stereoscopic video stream (such as input video stream 208 in FIG. 2B) with graphics data (e.g. RGBα stream 222), which may include AR enhancements as outlined herein. The 3D blended video stream 214 may be output by block 320 to HMD 140. Although, the examples above reference FIG. 2B and the 3D video streams, disclosed embodiments may also be used with input 2D video streams (e.g. 202 or 209) where depth information and registered 3D model 184 are determined using monocular VSLAM (e.g. based on the input 2D input video streams 202 or 209) and the output of block 320 may also occur as a 2D video stream (such as one of streams 204, 206, or 212).

In addition, other feedback (e.g. audio, haptic, etc.) may also be provided. In some instances, the α-blending may occur with left and right channels of an input 3D HD video stream (such as input video stream 208 in FIG. 2B). In some embodiments, time stamps associated with the streams 208 and other input streams may be synchronized. In some embodiments, the timestamps associated with the input streams may be synchronized using Network Time Protocol (NTP), or Simple Network Time Protocol (SNTP), or by other appropriate methods. The blended 3D video stream 214 may be output to HMD 140.

In some embodiments, the RGBα stream 222 output by block 330 may be stored/logged in data store 306. In some embodiments, each stream may be buffered. For example, each stream may have at least two frame buffers, one being written while another is read/processed and logic may switch between the two buffers. In some embodiments, the input video streams 202 may be blended (e.g., by alpha-blending) with the RGBα stream 222.

FIGS. 4A-4I show example image frames, which may form part of a blended output stream and viewed by a surgeon or another medical professional. In some embodiments, the example frames may be part of output streams 214 and/or 212 (FIG. 2B) or 204 and/or 206 (FIG. 2A). In some embodiments, the image frames in FIGS. 4A-4H may be displayed on HMD 140. In instances, where the blended output video stream is stereoscopic, FIGS. 4A-4H may represent one channel (left or right) of a current image of the blended 3D stereoscopic output video stream. A medical practitioner may see a 3D stereoscopic version (e.g. both left and right channels) on HMD 140. In FIGS. 4A-4H, the suffixes to reference numerals refer to the same element but at a different time and/or activation state.

Figure 4A:
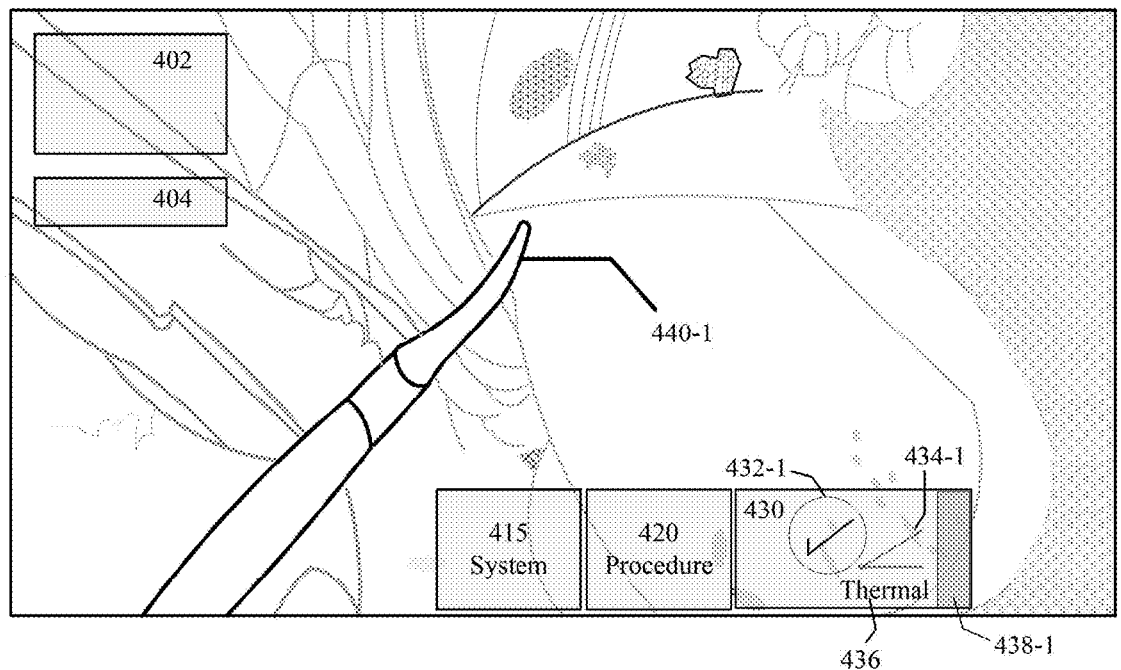
FIG. 4A-4I show example image frames, which may form part of a blended output stream and viewed by a surgeon or another medical professional.

FIG. 4A shows an example image frame (e.g., a current image frame) with an inactive MIS instrument 440-1 that is below a temperature threshold. For example, FIG. 4A may reflect an intraoperative image prior to MIS instrument activation. The visual indication may be provided by an appropriate visual enhancement of instrument 440-1, or by not visually enhancing instrument 440-1 (as shown in FIG. 4A), and/or by visually distinguishing the above state of instrument 440-1 from other possible states. In FIG. 4A, instrument 440-1 is shown without visualization enhancements to indicate (a) that it is inactive and (b) below a temperature threshold.

FIG. 4A also shows window 402, which may display patient related information (e.g. patient name, date of birth, medical condition, etc.) as configured by the surgeon or other medical professional. In some embodiments, window 404 may display information about instrument activations (e.g. the number and type of instruments currently active). Further, window 415 may display system specific information (e.g., MIS system name, model, etc.), while window 420 may indicate the specific procedure/sub-procedure and/or procedure code for a procedure currently being performed. In some embodiments, window 430 may include information about relevant states of instruments (e.g. thermal state and/or jaw open-closed state), and may use icons to indicate state. For example, icon 434-1 in window 430 indicates a jaw open state for instrument 440-1, while icon 432-1 indicates that all parameters associated with the instrument fall within their respective thresholds. Status bar 438-2 (which, in some instances, may also be color coded) indicates that MIS instrument 440-1 is not activated. In some embodiments, the parameter(s) being monitored may be indicated using a text box 436, which reads "Thermal" (for the temperature parameter) in FIG. 4A.

In some embodiments, windows 402, 404, 415, 420, and/or 430 may be user customizable so that the number of windows, location of each windows, window transparencies, and information shown in each window may be set by a user for each procedure type and may further be associated with a user-profile.

Figure 4B:
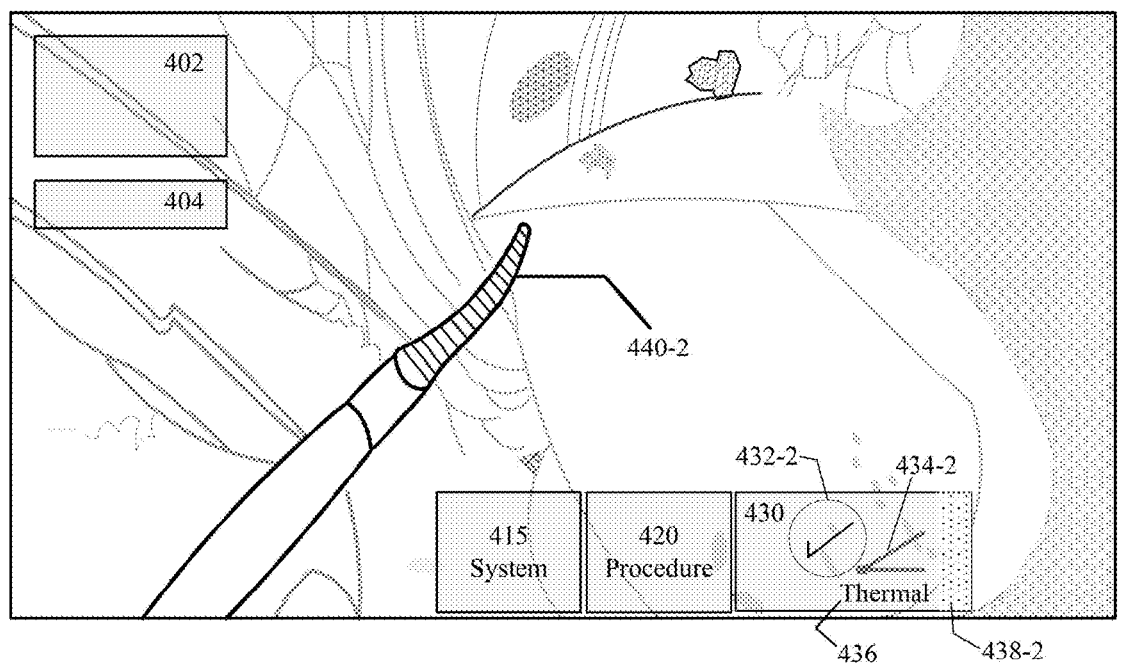

FIG. 4B shows another example image frame (e.g., a current image frame) with an active MIS instrument 440-2 above a temperature threshold. In FIG. 4B, references to and descriptions of some elements described previously have been omitted for simplicity. As shown in FIG. 4B, MIS instrument 440-2 is displayed with visualization enhancements indicated by the shaded area on instrument 440-2. For example, MIS instrument 440-2 may be color-coded to indicate activation state and/or temperature with: (a) color changing to reflect temperature of MIS instrument 440-2, or (b) color changing based on the degree to which the temperature of MIS instrument 440-2 exceeds a temperature threshold. For example, temperatures exceeding a temperature threshold may be displayed with shades of a first color (e.g. red), while temperatures below the threshold may be indicated with shades of a second color (e.g. yellow), while an activated (but unheated) instrument may be indicated with shades of a third color (e.g. green), and an inactive instrument (and unheated) may be indicated with a fourth color (e.g. grey).

As shown in FIG. 4B, window 430 includes information about relevant states of instruments. In window 430, icon 434-2 has been enhanced to indicate that the instrument is active; icon 432-2 and shaded status bar 438-2 may indicate that thermal state is below the temperature threshold; while icon 434-2 indicates a "jaw open" state.

As outlined previously, CNN based AI/ML pose estimation model 188 may be used to detect and segment instrument 440 in a current image frame. Pixels/voxels associated with the instrument may then be enhanced (e.g., using an appropriate mask to prevent any other pixels/voxels from being affected by enhancement operations) and projected into a graphics frame based on the current MIS system camera pose 189. The instrument related visual enhancements may be used along with windows 402, 404, 415, 420, and 430 to compose the graphics frame, which may be synchronized and blended (e.g. using α-blending) with an input video frame to obtain the blended image frame shown in FIG. 4B.

Figure 4C:
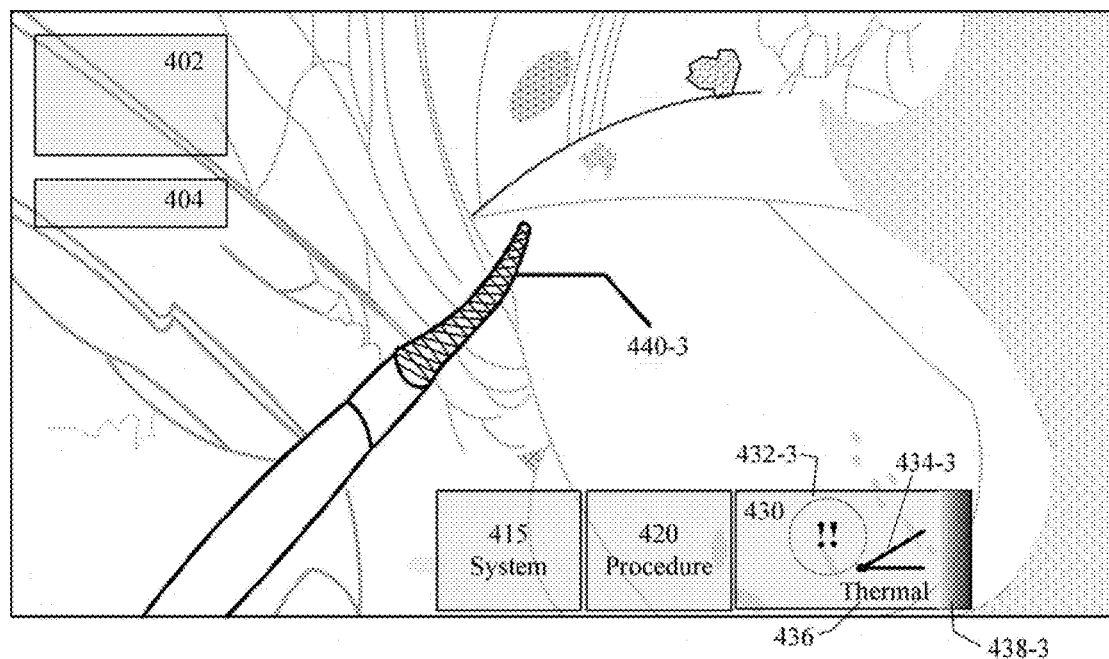

FIG. 4C shows another example image frame (e.g., a current image frame) with an active MIS instrument 440-2 above a temperature threshold. In FIG. 4C, references to and descriptions of some elements described previously have been omitted for simplicity. As shown in FIG. 4C, MIS instrument 440-2 is displayed with visualization enhancements indicated by the cross-hatched area on instrument 440-3. For example, MIS instrument 440-3 may be color-coded to indicate activation state and/or temperature with: (a) color changing to reflect temperature of MIS instrument 440-3, or (b) color changing based on the degree to which the temperature of MIS instrument 440-3 exceeds a temperature threshold.

As shown in FIG. 4C, window 430 includes information about relevant states of instruments. In window 430, icon 434-3 has been further enhanced to indicate that the thermal state exceeds a threshold and also indicates a "jaw open" state. Further, icon 432-3 indicates an alert/warning in relation to the "Thermal" parameter shown in text box 436 because the temperature of MIS instrument 440-3 exceeds the temperature threshold. In addition, in some embodiments, status bar 438-3, which may be color coded to reflect MIS instrument temperature, may be used to indicate the current thermal (or another monitored) state of the instrument 440-3.

As outlined previously, CNN based AI/ML pose estimation model 188 may be used to detect and segment instrument 440-3 in a current image frame. Pixels/voxels associated with MIS instrument 440-3 may then be enhanced (e.g., using an appropriate mask and without affecting any other pixels/voxels) and projected onto a graphics frame based on the current MIS system camera pose along with windows 402, 404, 415, 420, and 430. The graphics frame may be synchronized and blended with an input video frame to obtain the blended image frame shown in FIG. 4C.

Figure 4D:
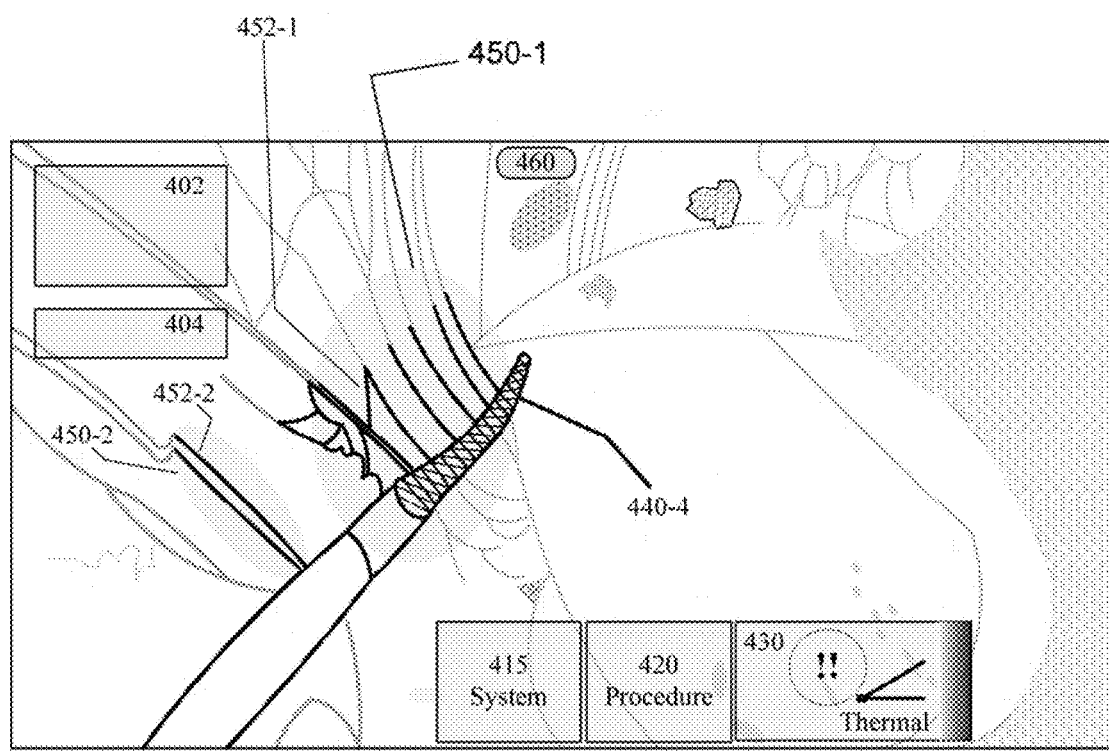

FIG. 4D shows another example image frame (e.g., a current image frame) with an active MIS instrument 440-4 above a temperature threshold along with proximate anatomical structures. In FIG. 4D, references to and descriptions of some elements described previously have been omitted for simplicity. As shown in FIG. 4D, MIS instrument 440-4 is displayed with visualization enhancements indicated by the cross-hatched area on instrument 440-4. In FIG. 4D, the cross-hatching indicates that instrument 440-4 is activated and that temperature of instrument 440-4 exceeds a predetermined temperature threshold. As outlined previously, in some embodiments, CNN based AI/ML pose estimation model 188 may be used to detect and segment instrument 440 in a current image frame and determine MIS system camera pose 189 and MIS instrument pose 191.

Further, as shown in FIG. 4D, one or more identified anatomical structures 452-1 and 452-2 that are proximate to MIS instrument 440-2 are also enhanced. Proximate anatomical structures may lie within some distance threshold of MIS instrument 440-4. In FIG. 4D, the visually enhanced proximate anatomical structures shown are blood vessels. Anatomical structures may be identified based on semantic segmentation. For example, semantic segmentations may be associated with registered 3D model 184. As outlined previously, semantic segmentation may include anatomical structure classification (e.g. blood vessels, lesions, tissue/ organ type, fat, etc.). Proximity of the identified anatomical structures to the MIS instrument 440-2 may be determined based on 6-DoF MIS instrument pose 191 by using registered 3D model 184. For example, pixels/voxels associated with anatomical structures (or portions of anatomical structures) may be determined (e.g., based on registered 3D model 184) to be proximate because they lie within some distance threshold of current MIS instrument pose 191. In some embodiments, sections of the current image—such as image sections 450-1 and 450-2—may be color coded based on their distance from MIS instrument 440-4.

In some embodiments, an alert or warning message may be displayed in window 460, to warn the surgeon that one or more anatomical structures are proximate to a heated instrument that is outside a safe range (e.g. above the temperature threshold).

The proximate pixels/voxels (e.g. associated with proximate anatomical structures 452) and/or image sections 450 may then be enhanced (e.g. using an appropriate mask). The visualization enhancements of MIS instrument 440-4, proximate anatomical structures 452, and/or proximate image sections 450 may be projected onto a graphics frame based on current MIS system camera pose 189 along with windows 402, 404, 415, 420, 430, and 460. The graphics frame may be synchronized and blended (e.g. using α-blending) to obtain the blended image frame shown in FIG. 4D, which may be part of a blended output video stream.

Figure 4E:
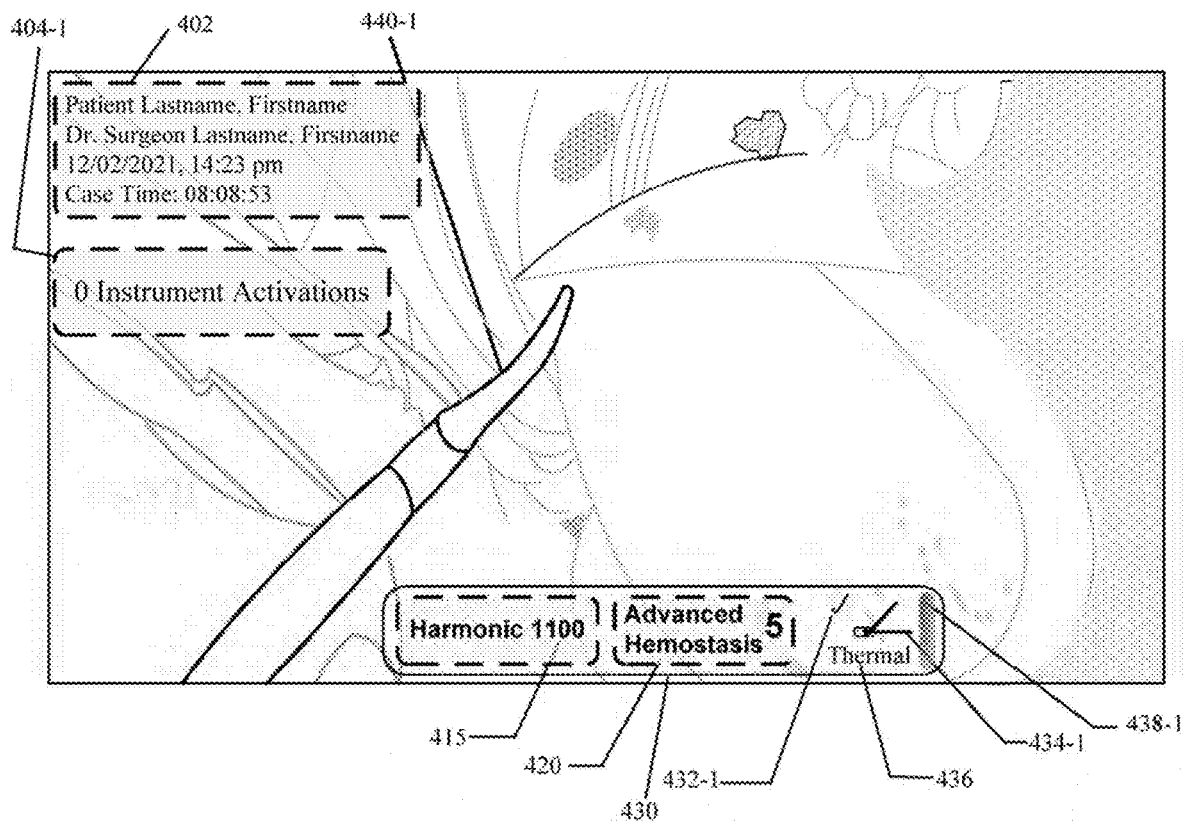

FIG. 4E shows a further example intraoperative image (similar to FIG. 4A), which may be part of a blended video stream. For example, FIG. 4E may reflect an intraoperative image prior to MIS instrument activation. In FIG. 4E, (a) patient related information is shown in window 402, (b) MIS instrument activation status in window 404 indicates that no (zero) instruments have been activated, (c) system information is indicated "Harmonic 1100" in window 415, the procedure is indicated as "Advanced Hemostasis" in window 420 with procedure code 5, and window 430 shows that "Thermal" parameter 436 is within a temperature threshold as indicated by check icon 432-1 and green bar/strip 438. Further, icon 434-2 indicates that the jaw state of instrument 440-1 is open. In FIG. 4E, instrument 440-1 has not been visually enhanced because instrument 440-1 has not been activated and no monitored parameter threshold (e.g. the temperature threshold) has been exceeded.

Thus, in the blended video stream output, a surgeon or medical practitioner may see (e.g. displayed on HMD 140): (1) patient related information (e.g. patient details, etc. in window 402), (2) MIS instrument activation status information (e.g. number of MIS instruments activated, etc. in window 404), (3) instrument related information (e.g. make/ model etc. in window 415), (4) procedure related information (e.g. procedure type, codes, etc. in window 420), (5) MIS instrument monitored parameters, (e.g. "Thermal" in text box 436) MIS instrument state (e.g. icon 432-1 and color bar 438 showing that monitored parameters—such as temperature—are within thresholds, icon 434-2"indicating jaw open" state) in window 430. Further, in some embodiments, (6) a visual indication may be provided that: (a) MIS instrument 440-1 has not been activated, and (b) all monitored parameters (e.g., thermal) fall within corresponding thresholds (e.g., MIS instrument temperature is below the temperature threshold). The visual indication may be provided by an appropriate visual enhancement of instrument 440-1, or by not visually enhancing instrument 440-1 (as shown in FIG. 4E), and/or by visually distinguishing the above state of instrument 440-1 from other possible states. The information in (1) through (6) above may form part of a graphics frame that may be synchronized and α-blended (e.g. in block 325 in FIG. 3A) into a current image frame in the input video stream (e.g. 202 in FIG. 2A, or 208 and/or 209 in FIG. 2B) to obtain the output blended video stream (e.g. 204 and/or 206, in FIG. 2A or 212 and/or 214 in FIG. 2B).

Figure 4F:
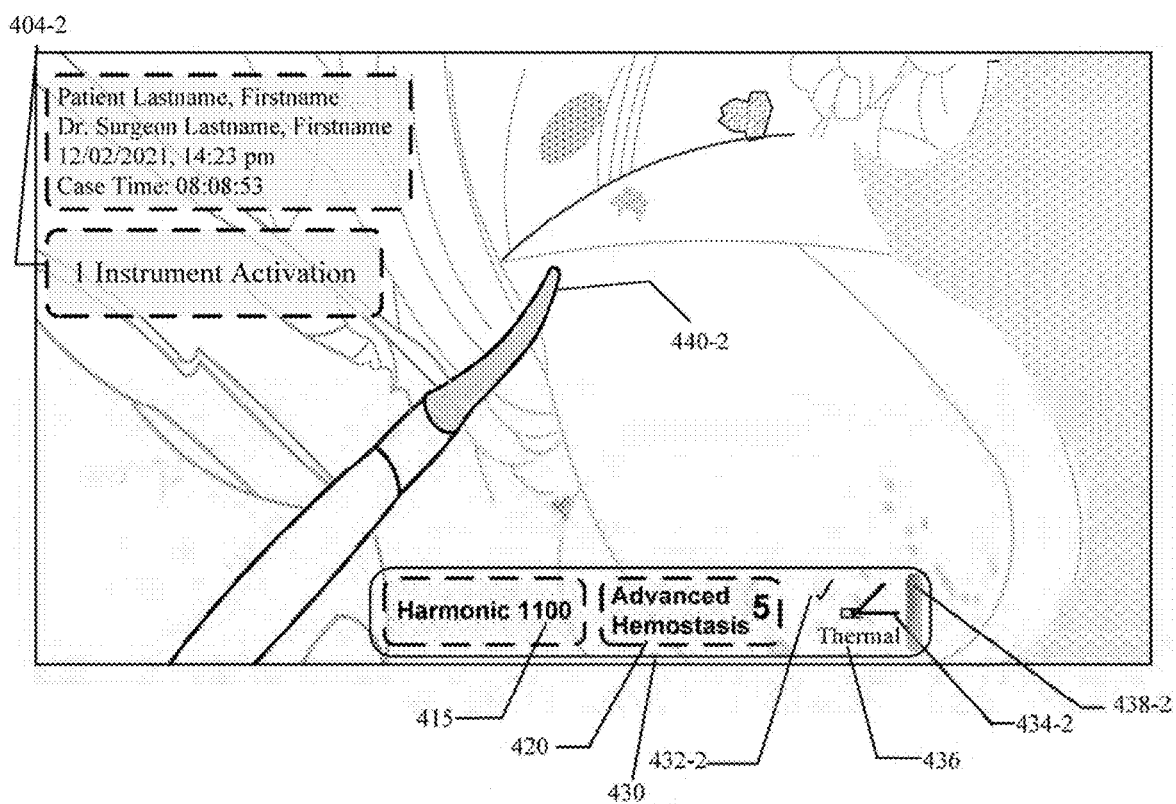

FIG. 4F shows a further example intraoperative image (similar to FIG. 4B), where MIS instrument 440-2 has been activated. In FIG. 4F, references to and descriptions of some elements described previously have been omitted for simplicity. As shown in FIG. 4F, window 404 includes text stating "1 instrument activations" indicating that MIS instrument 440-2 has been activated.

FIG. 4F also shows, in window 430, that MIS instrument monitored parameters, (e.g., temperature) are within thresholds. Further, in some embodiments, a visual indication may be provided that: (a) MIS instrument 440-1 has been activated, and (b) all monitored parameters (e.g., thermal) fall within corresponding thresholds (e.g., MIS instrument temperature is below the temperature threshold). The visual indication may be provided by an appropriate visual enhancement of MIS instrument 440-2. In FIG. 4F, MIS instrument 440-2 has now been highlighted with a green color to indicate the new state (e.g., MIS instrument 440 is active and all monitored parameters are within corresponding parameter thresholds). In some embodiments, auditory and/or other feedback may also be provided with an indication of instrument state. In some embodiments, CNN based AI/ML pose estimation model 188 may be used to detect and segment instrument 440 in a current image frame. Pixels/voxels associated with the instrument may then be enhanced (e.g., using masks to prevent other pixels/voxels from being affected by the enhancement operations) and projected into a current graphics frame based on current MIS camera pose 189. In addition to the instrument related visual enhancements, the current graphics frame may also include windows 402, 404, 415, 420, and 430. The current graphics frame may be blended with a current input image frame (e.g. part of an input video stream) to obtain the blended image frame shown in FIG. 4F.

Figures 4G, 4H:
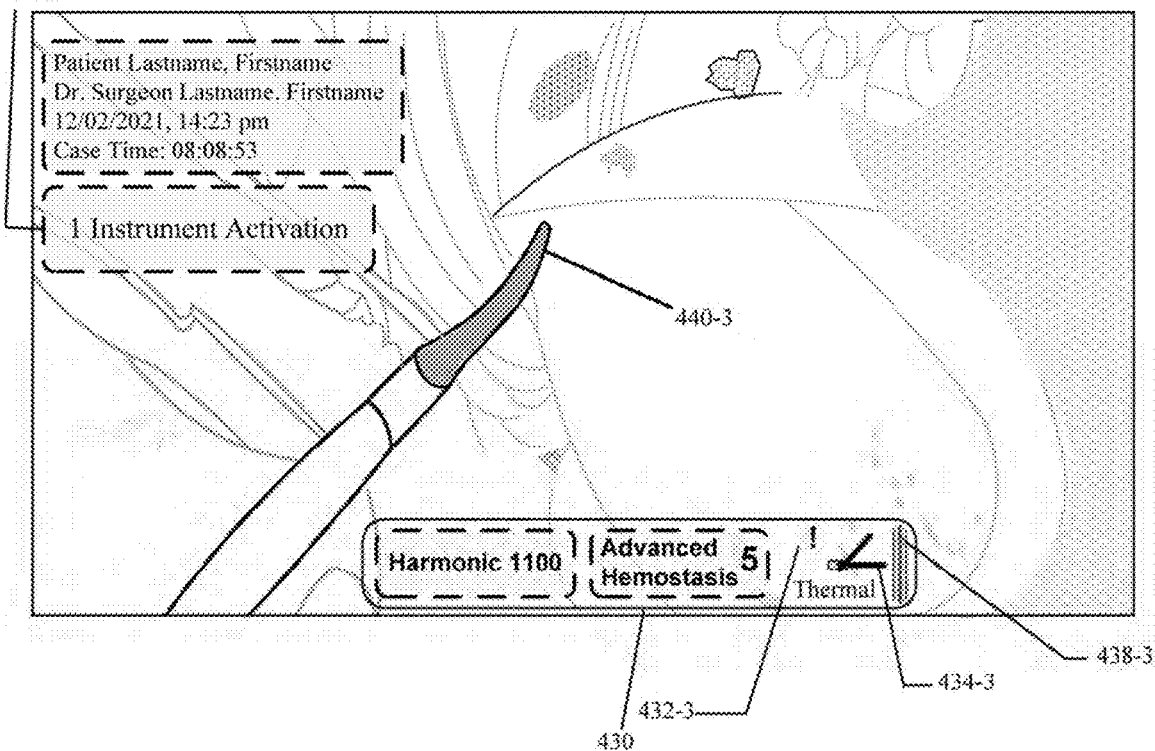

FIG. 4G shows a further example intraoperative image (similar to FIG. 4C), where MIS instrument 440-4 has been activated and a temperature threshold associated with a thermal/temperature parameter has been exceeded. In FIG. 4G, references to and descriptions of some elements described previously have been omitted for simplicity.

FIG. 4G also shows, in window 430, that MIS instrument monitored parameters, (e.g., temperature) exceed thresholds. Further, in some embodiments, a visual indication may be provided that: (a) MIS instrument 440-4 has been activated, and (b) at least one monitored parameter (e.g., thermal) exceeds a corresponding threshold (e.g., MIS instrument temperature is above the temperature threshold). The visual indication may be provided by an appropriate visual enhancement of MIS instrument 440-4. In FIG. 4F, MIS instrument 440-2 has now been highlighted with a red color to indicate the new state (e.g., MIS instrument 440 is active and at least one monitored parameter exceeds a corresponding parameter threshold). In some embodiments, CNN based AI/ML pose estimation model 188 may be used to detect and segment instrument 440 in a current image frame, determine MIS system camera pose 189, and MIS instrument pose 191. Pixels/voxels associated with the instrument may then be enhanced (e.g., using masks to prevent other pixels/voxels from being affected by the enhancement operations) and projected into a current graphics frame based on the current MIS system camera pose. In addition to the instrument related visual enhancements, the current graphics frame may also include windows 402, 404, 415, 420, and 430. The current graphics frame may be blended with a current input image frame (e.g. part of an input video stream) to obtain the blended image frame shown in FIG. 4G. In some embodiments, auditory and/or other feedback may also be provided indicating instrument state.

FIG. 4H shows a further example intraoperative image (similar to FIG. 4D), where MIS instrument 440-4 has been activated and a temperature threshold associated with a thermal/temperature parameter has been exceeded. FIG. 4H also shows visualization enhancements anatomical structures (e.g., 452-1 and 452-2) proximate to the instrument. Proximate anatomical structures may lie within some distance threshold of MIS instrument 440-4. In FIG. 4H, references to and descriptions of some elements described previously have been omitted for simplicity.

As shown in FIG. 4H, MIS instrument 440-4 is displayed with visualization enhancements indicated by the red color of instrument 440-4. In FIG. 4H, the red color of instrument 440-4 indicates that instrument 440-4 is activated and that temperature of instrument 440-4 exceeds a predetermined temperature threshold. As outlined previously, in some embodiments, CNN based AI/ML pose estimation model 188 may be used to detect and segment instrument 440 in a current image frame and determine MIS system camera pose 189 and MIS instrument pose 191.

Further, as shown in FIG. 4H, one or more identified anatomical structures 452-1 and 452-2 that are proximate to MIS instrument 440-4 are also enhanced. Proximate anatomical structures may lie within some distance threshold of MIS instrument 440-4. In FIG. 4H, the visually enhanced proximate anatomical structures shown are blood vessels. Anatomical structures may be identified based on semantic segmentation and associated with registered 3D model 184. Proximity of the identified anatomical structures to the MIS instrument 440-2 may be determined based on 6-DoF MIS instrument pose 191 by using registered 3D model 184. For example, pixels/voxels associated with anatomical structures (or portions of anatomical structures) may be determined (e.g., based on registered 3D model 184) to be proximate because they lie within some distance threshold of current MIS instrument pose 191. In FIG. 4H, sections of the current image—such as image sections 450-1 and 450-2—are colored red to indicate their proximity to MIS instrument 440-4. Further, window 460 also further displays a warning message relating to anatomical structure proximity indicating that the "Distance to risk structure low." MIS instrument visual enhancements and anatomical structure visual enhancements may be projected into a current graphics frame based on the current MIS camera pose 189. In addition, the current graphics frame may also include windows 402, 404, 415, 420, 430, and 460. The current graphics frame may be blended with a current input image frame (e.g. part of an input video stream) to obtain the blended image frame shown in FIG. 4H.

Figure 4I:
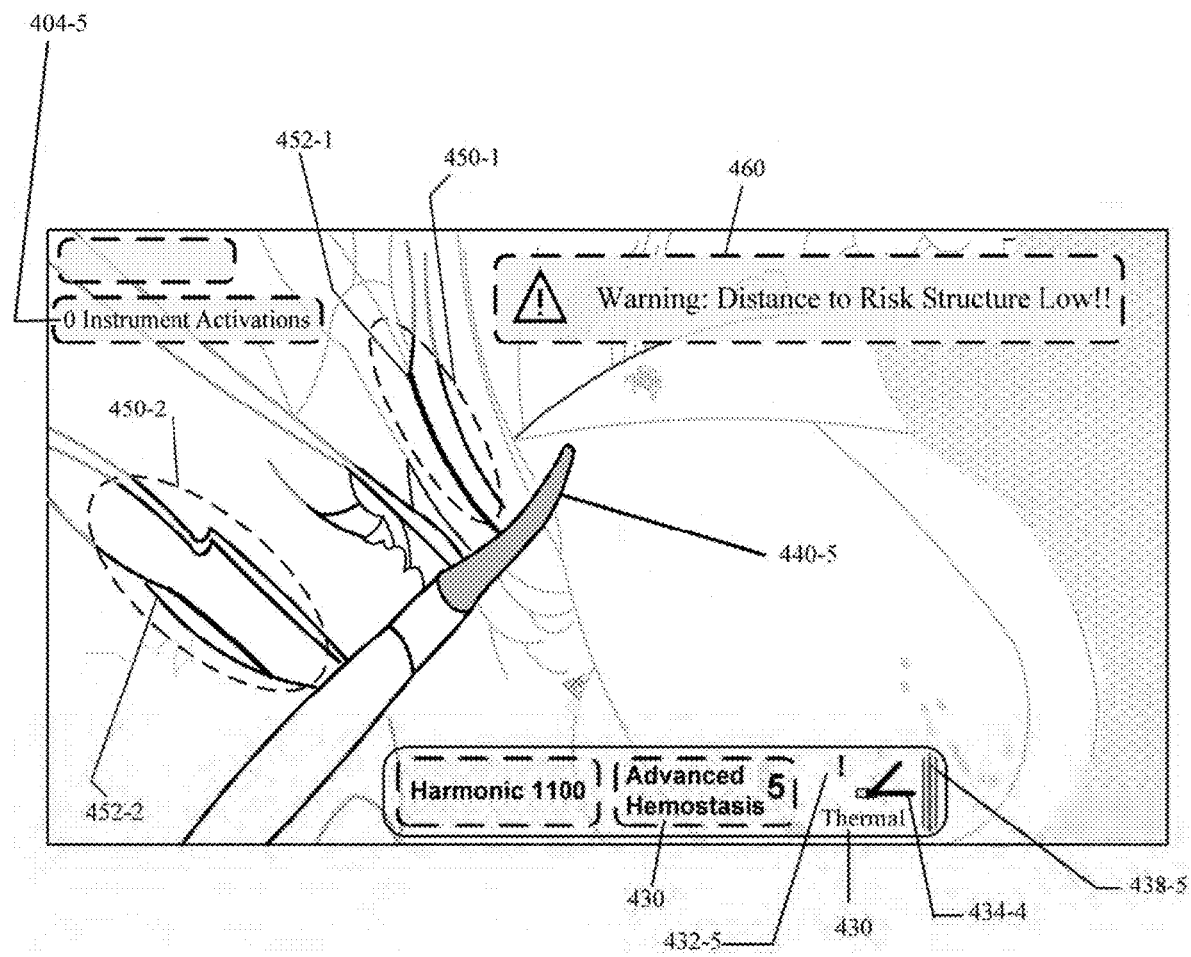

FIG. 4I shows a further example intraoperative image (similar to FIG. 4H), where MIS instrument 440-5 has been deactivated as indicated in window 404-5, which shows "0 Instrument Activations." However, the temperature of instrument 440-5 remains above a temperature threshold. For example, MIS instrument 440-5 may be cooled (or in the process of being cooled) prior to being used for another purpose (e.g., to grasp tissue). FIG. 4I also shows visualization enhancements anatomical structures (e.g., 452-1 and 452-2) proximate to the instrument. Proximate anatomical structures may lie within some distance threshold of MIS instrument 440-4. In FIG. 4I, references to and descriptions of some elements described previously have been omitted for simplicity.

In some embodiments, even after deactivation, a temperature sensor or mathematical model (e.g. based on resonance state and resonant frequency) may be used to determine a temperature of instrument 440-5 and visual enhancements may be applied to instrument 440-5 so long as the temperature of instrument 440-5 remains above the temperature threshold. As shown in FIG. 4I, instrument 440-5 is colored red to indicate that its temperature is above the temperature threshold. Further, window 460 continues to display a warning message relating to anatomical structure proximity indicating that the "Distance to risk structure low." In addition, icons 432-5 (!) and status bar 438-5 (colored red) indicate that the temperature of MIS instrument 440-5 exceeds the temperature threshold, icon 438-5. In some embodiments, as MIS instrument cools, the visualization enhancements (e.g., via color coding) may reflect the lower temperatures.

Figure 5:
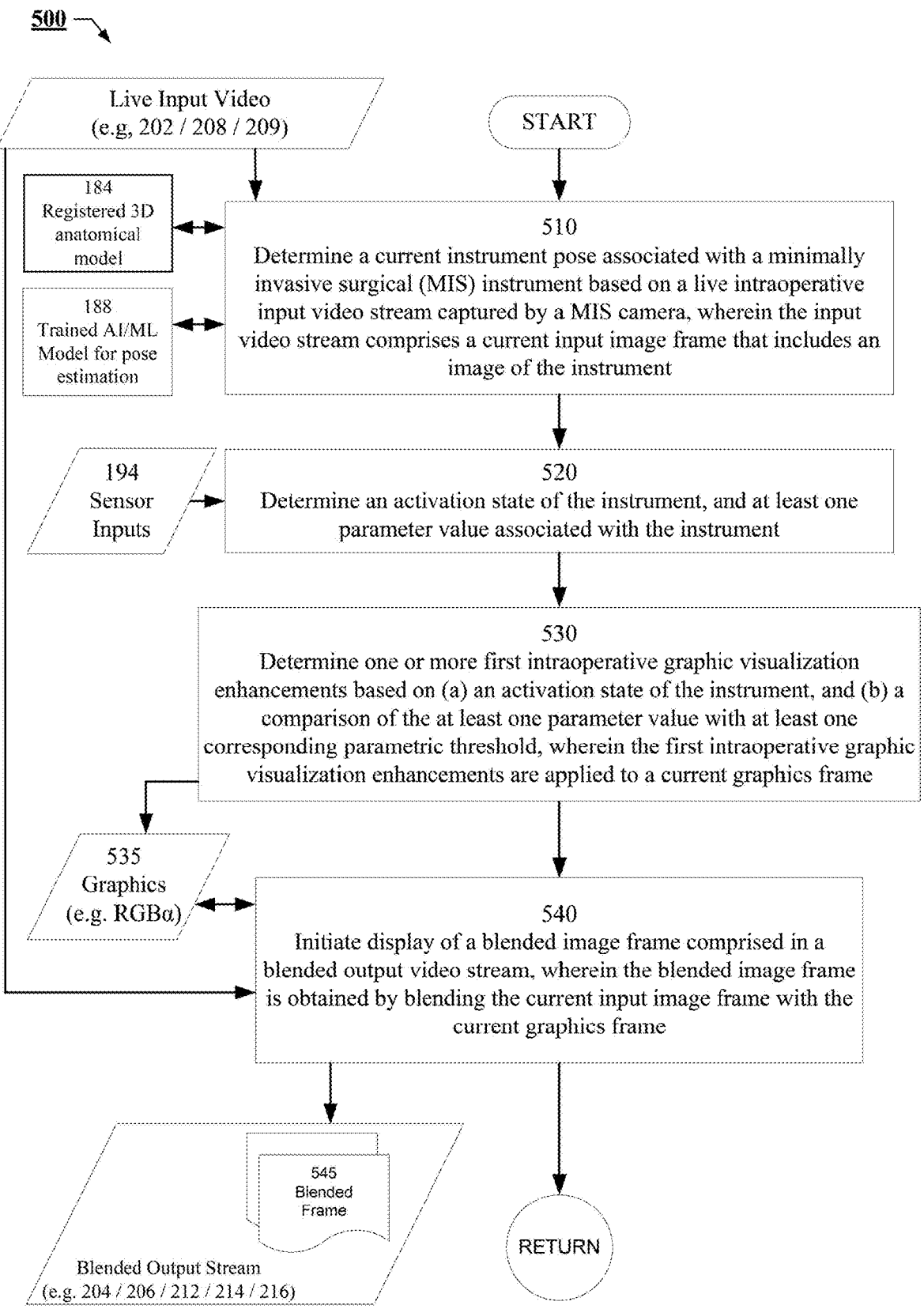
FIG. 5 shows a flowchart of example method for intraoperative tracking and visualization.

FIG. 5 shows a flowchart of an example method 500 for intraoperative instrument tracking and visualization. In some embodiments, method 500 may be used to augment portions of intraoperative images to facilitate data visualization. Method 500 may decrease cognitive load on medical professionals performing minimally invasive surgery and/or other medical procedures and enhance safety. In some embodiments, method 500 may be performed by an MIS system, which may include components such a camera, one or more instruments, one or more sensors, a display, and at least one processor coupled to the above components. In some embodiments, the display may include HMD 140 and/or monitors 135. In some embodiments, the camera may be a stereoscopic camera and HMD 140 may be capable of displaying stereoscopic images. In some embodiments, the at least one processor may form part of hub 150 and method 500 may be performed hub 150. In some embodiments, hub 150 may form part of MIS system. In some instances, method 500 may be performed intraoperatively in real time. For example, augmentations and/other visual, auditory, and/or tactile enhancements perceived by the user (e.g. a surgeon) may occur in synchronization with the live input video stream and with minimal delay.

In block 510, a current instrument pose (e.g., 6 Degrees of Freedom (6-DoF)) associated with a minimally invasive surgical (MIS) instrument may be determined. The current instrument pose may be determined based on a live intraoperative input video stream captured by a camera, where the input video stream may comprise a current input image frame that includes an image of the instrument (or a portion of the instrument). In some embodiments, the input video stream may be stereoscopic and/or comprise depth information. Depth information may be obtained (actively) from depth sensors that form part of the camera, or (passively) from a stereoscopic camera. In some embodiments, the camera may be monocular (non-stereoscopic), and depth information is obtained from the input video stream using monocular Visual Simultaneous Localization and Mapping (VSLAM) techniques. In some embodiments, the current instrument pose may be determined based on a 6-DoF current camera pose associated with the MIS system camera. In some embodiments, the current instrument pose may be determined using a trained machine learning (ML) model. For example, the AI/ML model may use a convolutional neural network (CNN) to detect and segment the instrument in the current image prior to determining the instrument pose.

In block 520, an activation state of the instrument and at least one parameter value associated with the instrument may be determined. For example, instrument activation state may be activated or inactivated. In some embodiments, the may include a standby mode, where sensory input from the instrument is available. For example, an instrument in standby mode may continue to output sensory information even when the instrument has been deactivated. As another example, an activated instrument may provide sensory input in standby mode without functionality associated with the instrument being actuated.

For example, the parameter(s) being monitored or determined may include a thermal or temperature parameter associated with the instrument, and the thermal parameter may be associated with a corresponding high temperature parametric threshold. As further examples, the parameter(s) being monitored or determined may include a radiated energy parameter associated with a corresponding radiated energy threshold; or an input energy parameter based on input energy to the instrument associated with a corresponding input energy parametric threshold; or some combination of the above. Other parameters that may be monitored may also include force applied, force and/or pressure distribution, tissue hydration state, blood pressure, heart rate, etc. Each parameter being monitored may be associated with a threshold, which may be customizable by the medical professional based on the procedure type, tissue type, and/or instrument.

The parameters may be determined based on information received from various sensors, which may for part of or be coupled to the MIS system. For example, the temperature of the instrument may be determined based on at least one of: information from a temperature sensor; or input voltage and input current to the instrument; or resonance state and resonance frequency associated with the instrument; or a combination thereof. In addition, although parameters may be received from instruments, or associated with sensors coupled to the MIS system, the parameters may reflect tissue state (e.g., hydration level, elasticity, deformation, etc.) or patient state (e.g., blood pressure, blood flow, oxygenation levels, etc.). Tissue related parameters or patient state parameters may influence instrument activation and/or use. In some embodiments, parameter thresholds may be determined based on (or reflect) safety considerations.

In block 530, one or more first intraoperative graphic visualization enhancements may be determined based on (a) an activation state of the instrument, and (b) a comparison of the at least one parameter value with at least one corresponding parametric threshold. In some embodiments, the first intraoperative graphic visualization enhancements may be applied to a current graphics frame 535 (e.g., being composed). The parameters/parameter values compared against corresponding thresholds may include any of the parameters described herein (including instrument, tissue state, patient state, etc.) and the first intraoperative graphic visualization enhancements may be based on the parameters/parameter values and/or thresholds.

The first intraoperative graphic visualization enhancements may be based on: the activation state of the instrument; or the at least one parameter value (e.g. temperature); or the degree to which the at least one parameter value falls outside the at least one corresponding parametric thresholds (e.g. difference or ratio of the instrument temperature to a temperature threshold); or a combination thereof. For example, the first intraoperative graphic visualization enhancements may include: color coding the instrument based on the at least one parameter value (e.g. the color may vary with instrument temperature); or color coding the instrument based on the degree to which the at least one parameter value falls outside the at least one corresponding parametric threshold (e.g. based on the temperature difference or ratio relative to the temperature threshold); or color coding the instrument based on the activation state of the instrument (e.g. whether active, inactive, standby, etc.); or a combination thereof. In some embodiments, the first intraoperative graphic visualization enhancements may comprise initiating the generation of an alert message when the one or more parameters associated with the instrument fall outside of the one or more corresponding parametric thresholds.

In some embodiments, the first visualization enhancements may include one or more information windows (such as those described above in relation to FIGS. 4A-4I): patient information window 402, instrument activation window 404, system information window 415, procedure information window 420, and/or instrument state window 430, which may include icons, status bars, etc. to indicate instrument state and monitored parameters. In some embodiments, information in the information windows may be received/obtained (e.g., by an MIS system 108 and/or hub 150) from other devices (e.g., medical devices, preoperative devices, storage devices, etc.) and/or from a system (e.g., hospital information system and/or patient database) and/or from cloud based services (e.g., from cloud based servers coupled to cloud 167).

In block 540, display of a blended image frame 545 that is comprised in a blended output video stream (e.g. one or more of output streams 204 and/or 206, or 212 and/or 214 and/or 216) may be initiated. For example, the blended image frame 545 may be obtained by blending the current input image frame with the current graphics frame 535. In some embodiments, blending may comprise: projecting the one or more first intraoperative graphic visualization enhancements into the current camera field of view (FoV) based on the camera pose to obtain (or compose) the current graphic frame 535; and synchronizing and blending the current input image frame with the current graphic frame 535 to obtain blended output frame 545. In some embodiments, the blended output video stream may be transmitted to a stereoscopic head mounted display (e.g. HMD 140) and/or on another monitor (e.g. monitor 135). The blended output video stream with all visual enhancements, including any AR enhancements, may be displayed on one or more of the appropriate devices (e.g. HMD 140 and/or monitors 135).

In some embodiments, method 500 may further comprise intraoperatively identifying one or more proximate anatomical structures (e.g. blood vessels or other organs/tissues) that lie within a distance threshold of the instrument in the current input image frame based on the current instrument pose and a 3-dimensional (3D) anatomical model. For example, the 3D anatomical model used to identify the anatomical structures may include semantic segmentations, and may be obtained by registration of a semantically segmented intraoperative 3D anatomical model obtained from the input video stream with a semantically segmented preoperative 3D anatomical model (e.g., obtained from a preoperative imaging device or image storage subsystem).

In some embodiments (e.g. upon identification of proximate anatomical structures), auditory feedback may be initiated when the at least one parameter value falls outside of at least one corresponding parametric threshold (e.g. instrument temperature exceeds the temperature threshold), wherein the auditory feedback is varied based on the distance of the instrument to at least one anatomic structure of the one or more proximate anatomical structures. The auditory feedback may vary in tone and/or in the number of times a tone is played over a given time period, and/or in amplitude/volume, based on instrument state and/or proximity of the instrument to the anatomical structure. In some embodiments, the anatomical structures identified may be limited to critical anatomical structures (e.g. which may be sensitive, and/or deemed as more likely give rise to procedural complications when inadvertently mishandled).

In some embodiments (e.g. upon identification of proximate anatomical structures), method 500 may further comprise, determining one or more second intraoperative graphic visualization enhancements for the one or more proximate anatomical structures. The second intraoperative graphic visualization enhancements may be applied to the current graphics frame prior to initiating the display of the blended image frame. For example, second intraoperative graphic visualization enhancements may be used to compose the current graphics frame prior to blending with the current input image frame so that the blended output reflects both the first and second visualization enhancements.

In some embodiments, the one or more second intraoperative graphic visualization enhancements applied to the proximate anatomical structures may be based on at least one parameter value falling outside the at least one corresponding parametric threshold (e.g. when temperature exceeds a temperature threshold); or based on corresponding distances of the one or more proximate anatomical structures from the instrument (e.g. proximity based enhancement of the anatomical structures); or a combination thereof. For example, the one or more second intraoperative graphic visualization enhancements may include: increasing the color intensity of the one or more proximate anatomical structures; or increasing the contrast of one or more proximate anatomical structures relative to the background (or relative to any other visible anatomical structures); or highlighting the one or more proximate anatomical structures; or color coding a subsection of the current graphics frame that includes the proximate anatomical structures; or color coding the one or more proximate anatomical structures in the current graphics frame (e.g. a proximity based color map) based on corresponding distances of one or more proximate anatomical structures from the instrument; or a combination thereof. Further, in some embodiments, the one or more second intraoperative graphic visualization enhancements may include initiating the generation of an alert message when the one or more parameters associated with the instrument fall outside of the one or more corresponding parametric thresholds based on the presence of proximate anatomical structures. The second intraoperative visualization enhancement may include the examples anatomical structure enhancements described in relation to FIGS. 4A through 4I.

Figure 6:
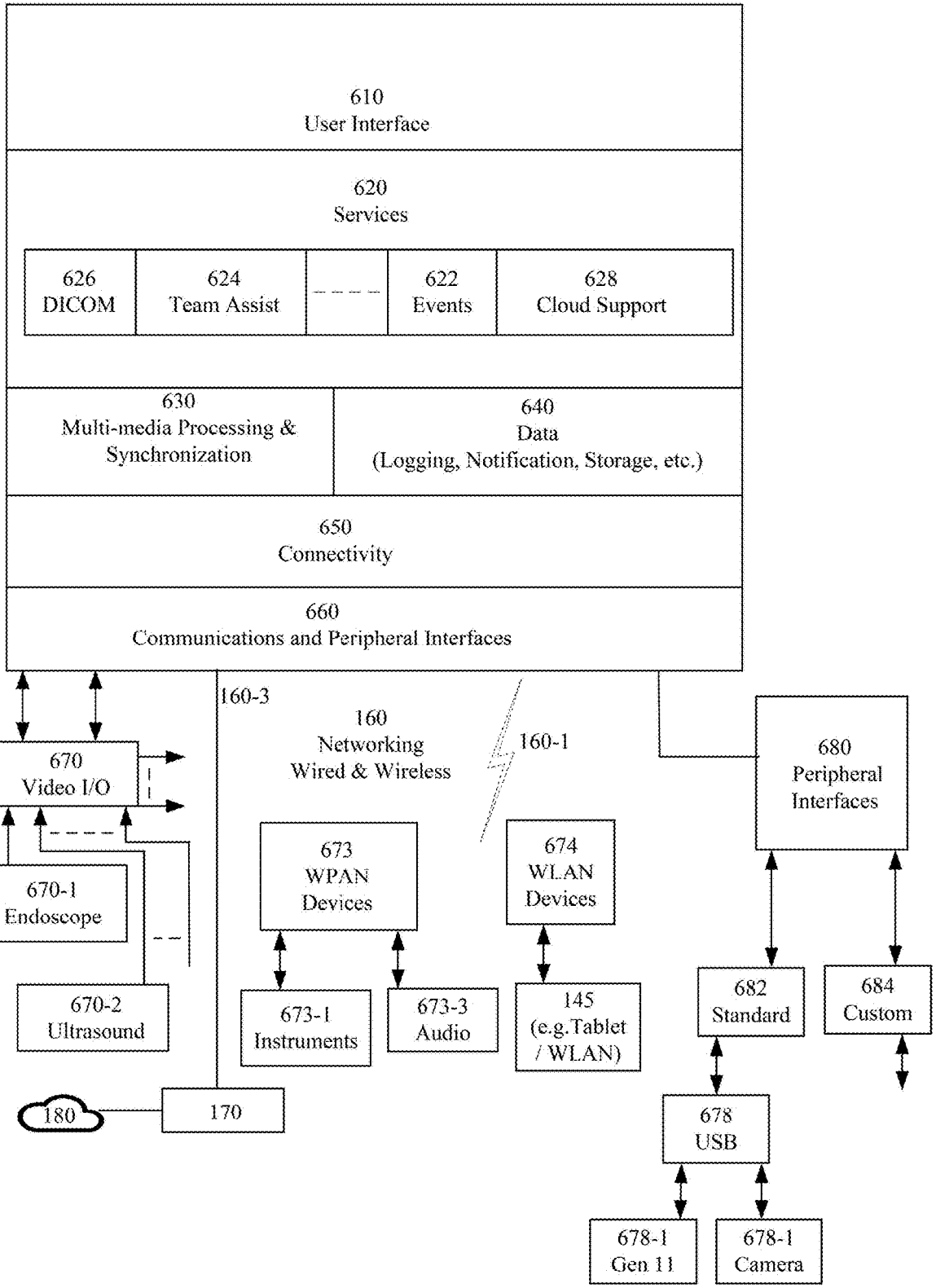
FIG. 6 shows an example software architecture associated with a system for intraoperative visualization in accordance with certain embodiments disclosed herein.

FIG. 6 shows an example system 600 illustrating the associated software architecture to support intraoperative tracking and visualization in accordance with certain embodiments disclosed herein. In some embodiments, some or all of the software architecture shown in FIG. 6 may be implemented on an MIS system and/or hub 150.

As shown in FIG. 6, software architecture 600 may include: (a) communication and peripheral services layer 660, which may support interfacing & communication with external devices; (b) connectivity layer 650, which may enable capture of incoming information and format and package information for output via communication and peripheral services layer 660; (c) data layer, which may enable intraoperative event logging, event notification, and data management including data storage and upload to online web-based services and/or cloud-based services and/or portals; (d) multimedia processing and synchronization layer 630, which may process and synchronize incoming streams. For example, incoming streams may include video from a stereo endoscope, video from intra-operative imaging devices (e.g., ultrasound probe, cameras in the operating room, etc.), sensor data, etc. In some embodiments, multimedia processing and synchronization layer 630 may appropriately encode (if desired), process, and synchronize the incoming streams to a common reference time.

UI layer 610, which may allow users to authorize connection of one or more devices, configure coupled devices, select streams, select AI models to run, select pre-operative and intra-operative image sources, configure procedure guidance (e.g. to be provided to medical professionals 120 and/or support staff), specify notifications (e.g. to be provided to personnel upon the occurrence of certain events), configure telementoring, etc. For example, trained AI/ML model for semantic segmentation 182, trained AI/ML model for pose estimation 188, etc. may be selected and configured for use using UI layer 610. The AI/ML and other models may be context specific to the instruments being used, the procedure being performed, and/or the anatomical environment.

Services layer 620, which may be modular, may provide capability to enable advanced applications including AI based applications to be used in an intraoperative setting. For example, services layer 620 may provide DICOM services functionality 626, which may catalog and list available sources for relevant preoperative images and may retrieve and store selected images/models locally. For example, services layer 620 may catalog, list, and retrieve a relevant preoperative 3D model 180, (which may be registered with an intraoperative 3D model, to obtain registered 3D model 184). Services layer 620 may also provide various medical team assist services. For example, services layer 620 may catalog and list available AI models for selection and running on live input video streams. The AI/ML models may perform or assist with 3D registration, semantic segmentation, etc. such as by identifying and mark pixels/voxels associated with blood vessels or other anatomical structures, mark pixels/voxels associated with MIS instruments, etc. Services layer 620 may also include event services functionality 622, which may record and log events; and cloud support services, which may allow access to cloud based applications, including AI/ML and other models, data service providers, etc. and also allow uploading of data for training/refining AI models, etc. Services layer 620 may also provide various other functionality such as a UI services functionality, which may allow interaction between UI layer and services.

In some embodiments, team assist services 624 may facilitate staff guidance to setup procedure guides tor specific procedures preoperatively and then use these guides intraoperatively to follow steps outlined in the guide. Machine Learning models may be trained offline based on recorded video and procedure setup for specific procedures to automatically recognize phases and steps outlined as part of the procedure. In some embodiments, the trained models may then process live endoscope video feed in real time to automatically recognize steps and phases and auto-advance an on-screen guide to the next step in a procedure guide by changing content.

Team assist services 624 may further include notification related services to facilitate messaging from within the operating room (OR) to personnel outside the OR based on the current status of a procedure. Messages may include one or more notifications such as: a procedure has started, a procedure is likely to complete or go past the scheduled time, an OR is ready, etc. Such notifications may help with planning and more effective use of resources.

In some embodiments, team assist services 624 may include configuration and enablement image viewing and image based planning functionality, which may facilitate processing, review, analysis, communication, and media interchange of multi-dimensional digital images acquired pre-operatively (e.g. from Computed Tomography (CT), Magnetic Resonance Imaging (MRI), Diagnostic Ultrasound, X-Ray, Positron Emission Tomography (PET) scans etc.) from imaging devices. Image viewer and image based planning may also facilitate preoperative surgical planning, and the intraoperative display of digital images by enabling 3D rendering and visualization and picture archiving and communication system (PACS) integration. In some embodiments, image viewing and image based planning functionality may also make the above information available over a network or over the web to authorized personnel and facilitate deployment of an online Digital Surgical Portal.

Integrated anatomy, 3D modeling, and patient outcome simulation functionality provided by team assist services 624 may use available pre-operative and intraoperative 3D models and facilitate display and manipulation of the 3D models for pre-operative planning and intra-operative reference and may improve visualization of anatomy and tumors and facilitate performance of patient-specific and procedure-specific simulation.

Multimedia processing and synchronization layer 630 may facilitate management and synchronization of connected input devices, enable data, video, and audio fusion and processing, and also provide services for data management (storage, retrieval, labeling, indexing, etc.)

Data layer 640 may facilitate scalable multi-service and device communication, provide notifications to all stakeholders related to intraoperative workflow, and facilitate systematic logging and storage of intraoperative information over hospital network 165 and/or through a cloud based data service provider.

Connectivity layer 650 may include functionality to facilitate multimedia data exchange and capture multimedia input received in various formats and over a variety of hardware interfaces such as video, audio, custom interfaces, and may also output information to connected displays as well as to tablet 145.

Communication and peripheral interface layer 660 may include software to configure and manage WLAN (e.g., Wi-Fi), WPAN (e.g., Bluetooth), WWAN (e.g., 5G), Ethernet, USB, custom peripheral port connectivity, etc.

As shown in FIG. 6, Communication and peripheral interface layer 660 may facilitate interaction with a variety of external devices and peripherals. For example, video inputs and outputs 670 may use the HDMI and/or SDI interfaces to receive video from devices such as endoscope 670-1, ultrasound 670-2, etc. Video inputs and outputs 670 may also output video to external displays 135 (not shown in FIG. 6).

Wired and wireless networking interface 160 may include wired network connections such as Ethernet connection 160-3, which may be used to: connect to servers, storage, services etc. on hospital network 170; facilitate data exchange with the digital surgical portal; and may provide connectivity to cloud based storage and/or services 175. Wireless network 160-1 may include interfaces for WLAN connections with external WLAN devices 174 such as tablet 145, which may allow users to interact with, configure, and manage system 600. In some embodiments, a local (e.g. operating room) wireless network 160 may be provided by hub 150, which may be used by authorized devices with access to the network to communicate with hub 150 and/or among themselves (e.g. improving bandwidth, latency, and decreasing reliance on the hospital network). Wireless network 160-1 may include interfaces for WPAN connections and communication with external WPAN (e.g. Bluetooth) devices such as audio devices, smart instruments, robotic instruments, sensors, etc.

Peripheral interfaces 680 may include standard interfaces such as USB, which may provide connectivity to OR cameras, provide power, and support surgical instruments such as surgical shears, sealers, etc. Custom interfaces 683 may include interfaces specific to a manufacturer such as for insufflation devices, couplings for electro-mechanical devices such as pumps, aspirators, irrigators, etc. (not shown in FIG. 6).

Although the present disclosure is described in connection with specific embodiments for instructional purposes, the disclosure is not limited thereto. Various adaptations and modifications may be made to the disclosure without departing from the scope. Therefore, the spirit and scope of the appended claims should not be limited to the foregoing description.

What is claimed is:

1. A processor-implemented method comprising:
   determining an instrument pose associated with a minimally invasive surgical (MIS) robotic instrument having an energy emitting end effector to cut a tissue or stop bleeding of the tissue, wherein the instrument pose is determined based on a live intraoperative input video stream captured by a MIS camera, wherein the input video stream comprises an input frame that includes an image of the instrument;
   while the energy emitting end effector is not in contact with the tissue, determining i) an activation state of the instrument and ii) parameters associated with the instrument including a temperature, a radiated energy, and an input energy of the energy emitting end effector;

performing a comparison of i) the temperature with a temperature threshold, ii) the radiated energy with a radiated energy threshold, and iii) the input energy with an input energy threshold;

intraoperatively identifying one or more anatomical structures in the input frame based on the instrument pose and a 3-dimensional (3D) anatomical model;

determining a proximity or distance of the instrument to the identified one or more anatomical structures;

determining one or more first intraoperative visualization enhancements based on a) the activation state of the instrument, b) the proximity or distance of the instrument to one of the identified one or more anatomical structures, c) the temperature, (d) the radiated energy, and (e) the input energy, wherein the one or more first intraoperative visualization enhancements are applied to a graphics frame;

initiating display of a blended frame comprised in an output video stream, wherein the blended frame is obtained by blending the input frame with the graphics frame, in response to determining i) the proximity or distance is below a distance threshold and ii) the temperature is greater than the temperature threshold, (iii) the radiated energy is greater than the radiated energy threshold, and (iv) the input energy is greater than the input energy threshold, displaying the one or more first intraoperative visualization enhancements in the blended frame as a visual warning that the instrument is too close to the identified one or more anatomical structures, and subsequently, in response to determining the proximity or distance is above the distance threshold, removing the visual warning.

2. The method of claim 1, wherein the one or more first intraoperative visualization enhancements comprise at least one of:

color coding the instrument based on the temperature, the radiated energy, or the input energy; or color coding the instrument based on the activation state of the instrument.

3. The method of claim 1, further comprising:

initiating generation of auditory feedback and varying the auditory feedback based on the distance of the instrument to at least one of the one or more identified anatomical structures.

4. The method of claim 1, further comprising:

determining one or more second intraoperative visualization enhancements for the one or more identified anatomical structures, wherein the one or more second intraoperative visualization enhancements are applied to the graphics frame;

wherein the one or more second intraoperative visualization enhancements comprise at least one of:

increasing the color intensity of the one or more identified anatomical structures;

increasing the contrast of the one or more identified anatomical structures relative to the background;

highlighting the one or more identified anatomical structures;

color coding a subsection of the graphics frame that includes the one or more identified anatomical structures; or color coding the one or more identified anatomical structures in the blended frame based on corresponding distances of the one or more identified anatomical structures from the instrument.

5. The method of claim 4, wherein the one or more second intraoperative visualization enhancements are determined based on at least one of the activation state of the instrument, the comparison of the temperature with the temperature threshold, the radiated energy with the radiated energy threshold, and the input energy with the input energy threshold, or corresponding distances of the identified one or more anatomical structures from the instrument.

6. The method of claim 1, wherein the temperature of the energy emitting end effector is determined based on at least one of:

information from a temperature sensor;

input voltage and input current to the instrument; or resonance state and resonance frequency associated with the instrument.

7. The method of claim 1, wherein the 3D anatomical model is semantically segmented and obtained by registration of a semantically segmented intraoperative 3D anatomical model obtained from the input video stream with a semantically segmented preoperative 3D anatomical model.

8. The method of claim 1, wherein the instrument pose is determined based on a 6-Degrees of Freedom camera pose associated with the MIS camera and wherein blending the input frame with the graphics frame comprises:

projecting the one or more first intraoperative visualization enhancements into a field of view (FoV) of the MIS camera based on the camera pose to obtain the graphics frame; and synchronizing and blending the input frame with the graphics frame.

9. The method of claim 8, wherein the instrument pose is determined using a trained machine learning (ML) model, wherein the ML model uses a convolutional neural network (CNN) to detect and segment the instrument in the input frame prior to determining the instrument pose.

10. The method of claim 1, further comprising:

transmitting the output video stream to a stereoscopic head mounted display.

11. The method of claim 1, further comprising:

when the blended frame is being displayed, generating a haptic feedback through a handheld control being used by a surgeon or medical professional to operate the instrument.

12. The method of claim 1, wherein the temperature threshold, the radiated energy threshold, the input energy threshold, or the distance threshold are customizable by a medical professional.

13. A minimally invasive surgical (MIS) system comprising:

a camera to obtain a live intraoperative input video stream, an MIS robotic instrument having an energy emitting end effector to cut a tissue or stop bleeding of the tissue, a memory, and a processor coupled to the camera, the instrument, and the memory, wherein the processor is configured to:

determine an instrument pose associated with the instrument based on the live intraoperative input video stream, wherein the input video stream comprises an input frame that includes an image of the instrument;

while the energy emitting end effector is not in contact with the tissue, determine an activation state of the instrument, and a plurality of parameters associated with the instrument including a temperature, a radiated energy, and an input energy of the energy emitting end effector;

perform a comparison of i) the temperature with a temperature threshold, ii) the radiated energy with a radiated energy threshold, and iii) the input energy with an input energy threshold;

intraoperatively identify one or more anatomical structures in the input frame based on the instrument pose and a 3-dimensional (3D) anatomical model;

determine one or more first intraoperative visualization enhancements based on a) the activation state of the instrument, b) proximity or distance of the instrument to the identified one or more anatomical structures, c) the temperature, d) the radiated energy, e) the input energy, wherein the one or more first intraoperative visualization enhancements are applied to a graphics frame;

initiate display of a blended frame comprised in an output video stream, wherein the blended frame is obtained by blending the input frame with the graphics frame and wherein in response to determining i) the proximity or distance is below a distance threshold, ii) the temperature is greater than the temperature threshold, (iii) the radiated energy is greater than the radiated energy threshold, and (iv) the input energy is greater than the input energy threshold, configuring the one or more first intraoperative visualization enhancements in the blended frame to display a visual warning that the instrument is too close to the identified one or more anatomical structures, and in response to determining the proximity or distance is above the distance threshold, the one or more first intraoperative visualization enhancements in the blended frame no longer display the visual warning.

14. The MIS system of claim 13, wherein the processor is further configured to:

initiate generation of auditory feedback in response to determining i) the proximity or distance is below the distance threshold and ii) the temperature is greater than the temperature threshold, the radiated energy is greater than the radiated energy threshold, and the input energy is greater than the input energy threshold, wherein the auditory feedback is varied based on the proximity or distance.

15. The MIS system of claim 13, wherein processor is further configured to determine one or more second intraoperative visualization enhancements for the one or more identified anatomical structures, wherein the one or more second intraoperative visualization enhancements are applied to the graphics frame, and the one or more second intraoperative visualization enhancements are based on determining i) the proximity or distance is below the distance threshold, ii) the temperature is greater than the temperature threshold, iii) the radiated energy is greater than the radiated energy threshold, or iv) the input energy is greater than the input energy threshold.

16. The system of claim 13, wherein the processor is further configured to:

when the blended frame is being displayed, generate a haptic feedback through a handheld control being used by a surgeon or medical professional to operate the instrument.

17. A non-transitory computer-readable medium comprising instructions to configure a processor to:

determine an instrument pose associated with a minimally invasive surgical (MIS) robotic instrument having an energy emitting end effector to cut a tissue or stop bleeding of the tissue, wherein the instrument pose is determined based on a live intraoperative input video stream captured by a MIS camera, wherein the input video stream comprises an input frame including an image of the instrument;

intraoperatively identify one or more anatomical structures in the input frame based on the instrument pose and a 3-dimensional (3D) anatomical model;

while the energy emitting end effector is not in contact with the tissue, determine one or more intraoperative visualization enhancements based on (a) an activation state of the instrument, (b) a determination that a temperature of the instrument is above a temperature threshold, (c) a determination that a radiated energy of the energy emitting end effector is above a radiated energy threshold, (d) a determination that an input energy of the energy emitting end effector is above an input energy threshold, and (e) a determination of a proximity or distance of the instrument to the identified one or more anatomical structures;

initiate display of a blended frame comprised in an output video stream, wherein the blended frame is obtained by blending the input frame with the one or more intraoperative visualization enhancements and wherein in response to determining i) the proximity or distance is below a distance threshold, ii) the temperature is greater than the temperature threshold, iii) the radiated energy is greater than the radiated energy threshold, and iv) the input energy is greater than the input energy threshold, configure the one or more intraoperative visualization enhancements in the blended frame to display a visual warning that the instrument is too close to the identified one or more anatomical structures, and in response to determining the proximity or distance is above the distance threshold, the one or more intraoperative visualization enhancements in the blended frame are configured to no longer display the visual warning.

* * * * *